United States Patent
Ezaki et al.

(10) Patent No.: US 10,408,126 B2
(45) Date of Patent: *Sep. 10, 2019

(54) VARIABLE LENGTH CONNECTING ROD AND VARIABLE COMPRESSION RATIO INTERNAL COMBUSTION ENGINE

(71) Applicant: TOYOTA JIDOSHA KABUSHIKI KAISHA, Toyota-shi, Aichi-ken (JP)

(72) Inventors: Shuichi Ezaki, Susono (JP); Akio Kidooka, Ashigarakami-gun (JP); Yoshiro Kamo, Ashigarakami-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 132 days.

This patent is subject to a terminal disclaimer.

(21) Appl. No.: 15/538,000

(22) PCT Filed: Dec. 22, 2015

(86) PCT No.: PCT/IB2015/002403
§ 371 (c)(1),
(2) Date: Jun. 20, 2017

(87) PCT Pub. No.: WO2016/103018
PCT Pub. Date: Jun. 30, 2016

(65) Prior Publication Data
US 2017/0342896 A1    Nov. 30, 2017

(30) Foreign Application Priority Data

Dec. 22, 2014 (JP) ................................. 2014-259439

(51) Int. Cl.
*F16C 7/06* (2006.01)
*F02B 75/32* (2006.01)
(Continued)

(52) U.S. Cl.
CPC ............ *F02B 75/045* (2013.01); *F02B 75/32* (2013.01); *F16C 7/06* (2013.01); *F16C 23/10* (2013.01); *F16C 2360/22* (2013.01)

(58) Field of Classification Search
CPC ........ F02B 75/045; F02B 75/32; F02B 33/12; F02B 75/065; F02B 75/246; F02B 75/243;
(Continued)

(56) References Cited

U.S. PATENT DOCUMENTS 2,989,954 A * 6/1961 Hulbert ................... F02B 75/04
123/48 B
3,418,982 A * 12/1968 Waugaman ........... F02B 75/044
123/48 B
(Continued)

FOREIGN PATENT DOCUMENTS

CN    102213332 A    10/2011
DE    3010567 A1 *    9/1981 .............. F02B 41/04
(Continued)

OTHER PUBLICATIONS

Office Action issued in U.S. Appl. No. 14/919,841 dated Apr. 12, 2017.
(Continued)

*Primary Examiner* — Hung Q Nguyen
*Assistant Examiner* — Brian P Monahon
(74) *Attorney, Agent, or Firm* — Finnegan, Henderson, Farabow, Garrett & Dunner, LLP

(57) ABSTRACT

A variable length connecting rod includes a connecting rod body, an eccentric member, a switching mechanism and a stopping mechanism. The eccentric member is provided at a small diameter end of the connecting rod body. The eccentric member rotates such that an effective length of the variable length connecting rod is varied. The switching
(Continued)

mechanism includes a hydraulic piston connected to the eccentric member. The eccentric member reaches a first position when the switching mechanism is in a first state. The eccentric member reaches a second position when the switching mechanism is in a second state. The stopping mechanism includes a stopping member that abuts against or engages with the eccentric member or the hydraulic piston such that the eccentric member is maintained at an intermediate position between the first position and the second position.

15 Claims, 17 Drawing Sheets

(51) Int. Cl.
    *F16C 23/10*     (2006.01)
    *F02B 75/04*     (2006.01)

(58) Field of Classification Search
    CPC ........ F16C 7/06; F16C 2360/22; F16C 23/10; F01M 1/06; F01M 2001/066; F01M 2011/027; F01M 11/03; F01C 1/07; F01L 11/04

See application file for complete search history.

(56) References Cited

U.S. PATENT DOCUMENTS

| | | | |
|---|---|---|---|
| 5,247,911 A * | 9/1993 | Nenicka | F02F 3/0015 123/48 B |
| 5,257,600 A * | 11/1993 | Schechter | F02B 75/044 123/78 B |
| 6,568,357 B1 | 5/2003 | Rao et al. | |
| 6,622,669 B1 | 9/2003 | Nageswar Rao et al. | |
| 6,705,255 B2 | 3/2004 | Papaioannou et al. | |
| 6,752,105 B2 | 6/2004 | Gray, Jr. | |
| 7,469,663 B1 * | 12/2008 | Berger | F02B 75/045 123/48 B |
| 7,685,974 B2 * | 3/2010 | Berger | F02B 75/045 123/48 B |
| 7,762,066 B2 * | 7/2010 | Cannata | B60K 6/12 123/48 B |
| 8,151,691 B2 | 4/2012 | Pirault et al. | |
| 9,890,702 B2 * | 2/2018 | Schaffrath | F02B 75/045 |
| 9,958,004 B2 | 5/2018 | Ezaki et al. | |
| 10,167,776 B2 * | 1/2019 | Meacham | F16C 3/28 |
| 2003/0075125 A1 | 4/2003 | Kreuter | |
| 2003/0209219 A1 * | 11/2003 | Klomp | F02B 75/045 123/197.4 |
| 2004/0025814 A1 * | 2/2004 | Gray, Jr. | F02B 75/045 123/48 B |
| 2004/0261733 A1 * | 12/2004 | Henig | F02B 75/045 123/78 E |
| 2009/0107465 A1 * | 4/2009 | Berger | F02B 75/045 123/48 B |
| 2009/0205615 A1 * | 8/2009 | Cannata | F02B 75/044 123/48 B |
| 2010/0258074 A1 * | 10/2010 | Rabhi | F01B 9/047 123/195 R |
| 2011/0126806 A1 * | 6/2011 | Lee | F02D 15/02 123/48 B |
| 2015/0059683 A1 * | 3/2015 | Schulze | F02B 75/045 123/197.3 |
| 2015/0233288 A1 * | 8/2015 | Paul | F02B 75/045 123/48 B |
| 2015/0260094 A1 | 9/2015 | Wittek | |
| 2016/0177997 A1 * | 6/2016 | Ezaki | F16C 7/06 123/48 B |
| 2017/0159559 A1 * | 6/2017 | Meacham | F16C 3/28 |
| 2017/0248074 A1 * | 8/2017 | Ezaki | F02D 15/02 |
| 2017/0314462 A1 * | 11/2017 | Miyazato | F02B 75/045 |
| 2017/0328276 A1 * | 11/2017 | Kamo | F02B 75/045 |
| 2017/0342896 A1 * | 11/2017 | Ezaki | F02B 75/045 |
| 2017/0342897 A1 * | 11/2017 | Ezaki | F02B 75/045 |

FOREIGN PATENT DOCUMENTS

| | | | |
|---|---|---|---|
| DE | 31 48 193 A1 | 6/1983 | |
| DE | 102005055199 A1 * | 5/2007 | ............ F02B 75/045 |
| DE | 102010061361 A1 * | 4/2012 | ............ F02D 15/02 |
| DE | 102010061360 A1 * | 6/2012 | ............ F02B 75/045 |
| DE | 102011001727 A1 * | 10/2012 | ............ F16C 7/06 |
| DE | 102011056298 A1 * | 6/2013 | ............ F02B 75/045 |
| DE | 10 2012 020 999 A1 | 1/2014 | |
| DE | 102012020999 A1 * | 1/2014 | ............ F02B 75/045 |
| DE | 102012112434 A1 * | 6/2014 | ............ F02B 75/045 |
| DE | 10 2013 014 090 A1 | 3/2015 | |
| JP | 59-040537 U | 3/1984 | |
| JP | 2011-196549 | 10/2011 | |
| JP | 2015014286 A * | 1/2015 | ............ F02B 75/044 |
| JP | 2016118180 A * | 6/2016 | ................ F16C 7/06 |
| WO | WO-2005049990 A1 * | 6/2005 | ............ F02B 75/32 |
| WO | WO 2014/019683 A1 | 2/2014 | |

OTHER PUBLICATIONS

Notice of Allowance issued in U.S. Appl. No. 14/919,841 dated Sep. 7, 2017.

* cited by examiner

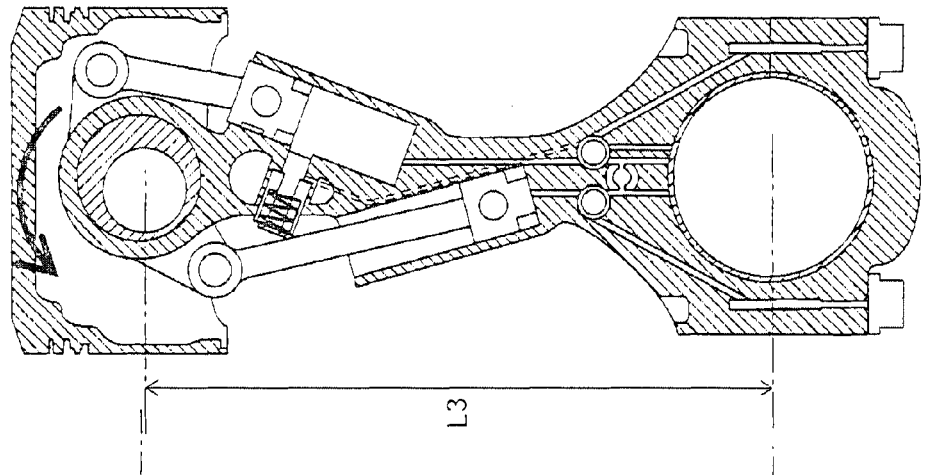
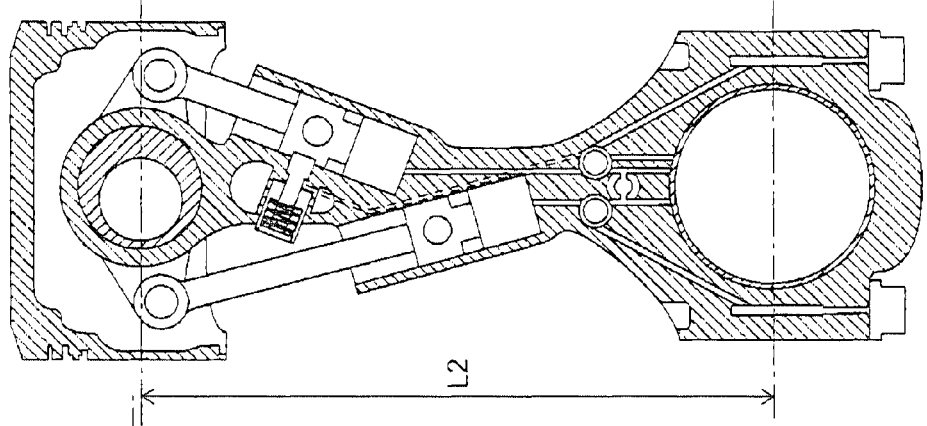
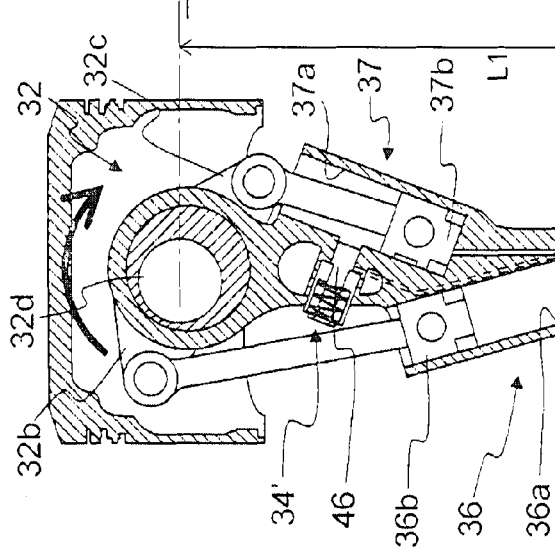

VARIABLE LENGTH CONNECTING ROD AND VARIABLE COMPRESSION RATIO INTERNAL COMBUSTION ENGINE

CROSS-REFERENCE TO RELATED APPLICATIONS

This application is a national phase application of International Application No. PCT/IB2015/002403, filed Dec. 22, 2015, and claims the priority of Japanese Application No. 2014-259439, filed Dec. 22, 2014, the content of both of which is incorporated herein by reference.

BACKGROUND

1. Technical Field

The invention relates to a variable length connecting rod, an effective length of which can be varied, and a variable compression ratio internal combustion engine including the variable length connecting rod.

2. Description of Related Art

An internal combustion engine including a variable compression ratio mechanism that can vary a mechanical compression ratio of the internal combustion engine has been known. Examples of the variable compression ratio mechanism include those that vary an effective length of a connecting rod used in the internal combustion engine (for example, Japanese Patent Application Publication No. 2011-196549, and International Publication No. WO2014/019683). The effective length of the connecting rod means a distance between the center of an opening that receives a crankpin and the center of an opening that receives a piston pin in the connecting rod. Therefore, when the effective length of the connecting rod is increased, a volume of a combustion chamber when a piston is at a compression top dead center is decreased, so that the mechanical compression ratio is increased. On the other hand, when the effective length of the connecting rod is decreased, the volume of the combustion chamber when the piston is at the compression top dead center is increased, so that the mechanical compression ratio is decreased.

A connecting rod in which an eccentric member (an eccentric arm or an eccentric sleeve) that can rotate with respect to a connecting rod body is provided at a small diameter end of the connecting rod body has been known as the variable length connecting rod, the effective length of which can be varied (for example, JP 2011-196549 A, and International Publication No. WO2014/019683). The eccentric member has an opening that receives a piston pin. The opening of the eccentric member is provided eccentrically from a rotational axis of the eccentric member. In the variable length connecting rod, when a rotational position of the eccentric member is changed, the effective length of the connecting rod can be correspondingly varied.

SUMMARY

In the internal combustion engine including the variable compression ratio mechanism, as the number of switchable stages of the mechanical compression ratio is increased, the internal combustion engine can be more efficiently operated. However, in the connecting rods described above, the eccentric member can be maintained only at two positions: a first rotational position reached when the eccentric member is maximally rotated to one side with respect to the connecting rod body, and a second rotational position reached when the eccentric member is maximally rotated to an opposite side to the one side. In other words, in the connecting rods, the mechanical compression ratio can be switched only in two stages.

The disclosure provides a variable length connecting rod, an effective length of which can be varied and maintained in more stages than two. The disclosure provides a variable compression ratio internal combustion engine, a mechanical compression ratio of which can be varied and maintained in more stages than two only by varying the effective length of the connecting rod.

An example aspect of the disclosure provides a variable length connecting rod includes a connecting rod body, an eccentric member, a rotational-direction switching mechanism and an intermediate stopping mechanism. The connecting rod body includes a large diameter end and a small diameter end, the small diameter end is an end portion positioned on an opposite side to the large diameter end in an axial direction of the connecting rod body. The connecting rod body has a first opening that receives a crankpin at the large diameter end. The eccentric member is provided at the small diameter end such that the eccentric member rotates in a circumferential direction of the small diameter end with respect to the connecting rod body. The eccentric member has a second opening that receives a piston pin. The eccentric member is configured to rotate such that a position of the second opening relative to the connecting rod body is changed and an effective length of the variable length connecting rod is varied. The rotational-direction switching mechanism includes a hydraulic piston. The hydraulic piston is connected to the eccentric member such that an operating position of the hydraulic piston is changed along with a change in a rotational position of the eccentric member. The rotational-direction switching mechanism is configured to be switched between a first state and a second state. The first state is a state in which the eccentric member rotates to a first side, and rotation of the eccentric member to a second side that is a direction opposite to the first side is prohibited. The second state is a state in which the eccentric member rotates to the second side, and rotation of the eccentric member to the first side is prohibited. The eccentric member maximally rotates to the first side to reach a first rotational position, and is maintained at the first rotational position when the rotational-direction switching mechanism is in the first state. The eccentric member maximally rotates to the second side to reach a second rotational position, and is maintained at the second rotational position when the rotational-direction switching mechanism is in the second state. The intermediate stopping mechanism includes a stopping member. The stopping member is configured to abut against or engage with the eccentric member or the hydraulic piston such that the eccentric member is maintained at an intermediate rotational position between the first rotational position and the second rotational position when the eccentric member is at the intermediate rotational position.

In the variable length connecting rod, the intermediate stopping mechanism may be provided in the connecting rod body. The stopping member may be configured to project from the connecting rod body. The stopping member may be configured to project from the connecting rod body when a hydraulic pressure equal to or higher than a given pressure is supplied to the intermediate stopping mechanism. The stopping member may be configured to abut against the eccentric member when the stopping member projects from the connecting rod body, and the eccentric member may be at the intermediate rotational position.

In the variable length connecting rod, the connecting rod body may include a rod portion, the rod portion may be positioned between the large diameter end and the small diameter end. The intermediate stopping mechanism may be disposed on the small diameter end side of the connecting rod body.

In the variable length connecting rod, the eccentric member may include a sleeve, a first arm, and a second arm, the first arm being coupled to the sleeve. The eccentric member may be connected to the hydraulic piston of the rotational-direction switching mechanism. The second arm may be coupled to the sleeve, and may be disposed opposite to the first arm with respect to the sleeve. The connecting rod body may have a third opening that receives the sleeve. The sleeve may be configured to rotate in the circumferential direction of the small diameter end in the third opening. The second arm may be configured to abut against the stopping member when the stopping member projects from the connecting rod body.

In the variable length connecting rod, the second arm may be curved so as to extend toward the large diameter end with respect to a radial direction of the eccentric member at an end portion opposite to the sleeve side.

In the variable length connecting rod, the eccentric member may be provided such that the piston pin receiving opening is eccentric from a rotational axis of the eccentric member toward the first arm.

In the variable length connecting rod, the stopping member may be configured to slide in an axial direction of the stopping member according to the hydraulic pressure supplied to the intermediate stopping mechanism. The stopping member may be configured to slide so as to project from the connecting rod body. A sliding direction of the stopping member may be perpendicular to an axis of the first opening and a longitudinal axis of the connecting rod body.

In the variable length connecting rod, the connecting rod body may include a hydraulic cylinder, the hydraulic cylinder accommodating the hydraulic piston of the rotational-direction switching mechanism. The hydraulic piston of the rotational-direction switching mechanism may have an engagement groove in a side surface of the rotational-direction switching mechanism. The intermediate stopping mechanism may be disposed within the connecting rod body. The stopping member may be configured to project into the hydraulic cylinder when a hydraulic pressure equal to or higher than a given pressure is supplied to the intermediate stopping mechanism. The stopping member may be configured to engage with the engagement groove of the hydraulic piston when the stopping member projects into the hydraulic cylinder.

In the variable length connecting rod, the eccentric member may include a sleeve, a first arm, and a second arm. The first arm may be coupled to the sleeve. The second arm may be coupled to the sleeve, and may be disposed opposite to the first arm with respect to the sleeve. The connecting rod body may have a third opening that receives the sleeve, the connecting rod body including a first hydraulic cylinder and a second hydraulic cylinder. The sleeve may be configured to rotate in the third opening. The rotational-direction switching mechanism may include a first hydraulic piston and a second hydraulic piston, the first hydraulic piston being configured to slide in the first hydraulic cylinder, and may be connected to the first arm. The second hydraulic piston may be configured to slide in the second hydraulic cylinder, and may be connected to the second arm. The stopping member may be configured to engage with only one of the first hydraulic piston and the second hydraulic piston.

In the variable length connecting rod, the second hydraulic cylinder may be disposed closer to the small diameter end than the first hydraulic cylinder, and the stopping member may be configured to engage with the second hydraulic piston.

In the variable length connecting rod, the eccentric member may be configured such that the effective length of the variable length connecting rod is maximum when the eccentric member is at the first rotational position. The intermediate stopping mechanism may be configured such that the hydraulic pressure equal to or higher than the given pressure is supplied to the intermediate stopping mechanism only when the rotational-direction switching mechanism is in the first state.

In the variable length connecting rod, the rotational-direction switching mechanism and the intermediate stopping mechanism may be connected to a same hydraulic pressure supply source. The rotational-direction switching mechanism may be configured to be in the first state when a hydraulic pressure supplied from the hydraulic pressure supply source has a first threshold value or higher, and be in the second state when the hydraulic pressure supplied from the hydraulic pressure supply source is lower than the first threshold value. The intermediate stopping mechanism may be configured such that the stopping member projects from the connecting rod body or into the hydraulic cylinder that accommodates the hydraulic piston when the hydraulic pressure supplied from the hydraulic pressure supply source has a second threshold value or higher. The first threshold value may be lower than the second threshold value.

In the variable length connecting rod, the hydraulic pressure may supplied to the rotational-direction switching mechanism, and the intermediate stopping mechanism may be switched by a hydraulic pressure switching mechanism. The hydraulic pressure switching mechanism may include a switching valve that switches a flow of hydraulic oil. The switching valve may be configured to change the hydraulic pressure supplied to the rotational-direction switching mechanism and the intermediate stopping mechanism.

Another example aspect of the disclosure provides a variable compression ratio internal combustion engine that includes the variable length connecting rod. The effective length of the variable length connecting rod is varied such that a mechanical compression ratio is varied.

In accordance with the above configuration, the variable length connecting rod, the effective length of which can be varied and maintained in more stages than two is provided. Also, in accordance with the above configuration, the variable compression ratio internal combustion engine, the mechanical compression ratio of which can be varied and maintained in more stages than two only by varying the effective length of the connecting rod is provided.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 9 is a schematic view for explaining an operation of the variable length connecting rod when a medium hydraulic pressure is supplied to switching pins or the like;

FIG. 10 is a schematic view for explaining an operation of the variable length connecting rod when a high hydraulic pressure is supplied to the switching pins or the like;

FIG. 11 is a schematic view for explaining an operation of the variable length connecting rod when a low hydraulic pressure is supplied to the switching pins or the like;

FIG. 16 is a schematic view for explaining an operation of the variable length connecting rod when a medium hydraulic pressure is supplied to switching pins or the like;

FIG. 17 is a schematic view for explaining an operation of the variable length connecting rod when a high hydraulic pressure is supplied to the switching pins or the like;

FIG. 18 is a schematic view for explaining an operation of the variable length connecting rod when a low hydraulic pressure is supplied to the switching pins or the like; and FIGS. 19A to 19C are sectional side views schematically illustrating the variable length connecting rod according to the second embodiment.

DETAILED DESCRIPTION OF EMBODIMENTS

Figure 1:
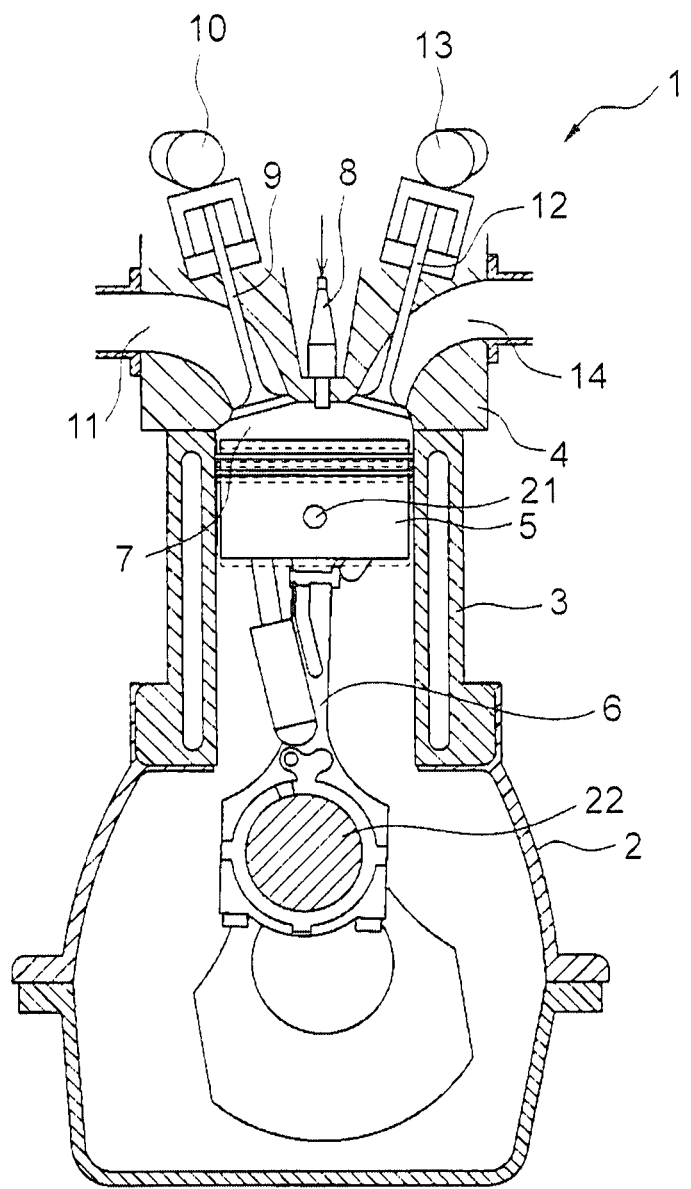
FIG. 1 is a schematic sectional side view of a variable compression ratio internal combustion engine.

Hereinafter, embodiments will be described in detail by reference to the drawings. Note that like constituent elements are assigned the same reference numerals in the following description.

FIG. 1 is a schematic sectional side view of a variable compression ratio internal combustion engine according to one embodiment. By referring to FIG. 1, reference numeral 1 denotes an internal combustion engine. The internal combustion engine 1 includes a crankcase 2, a cylinder block 3, a cylinder head 4, a piston 5, a variable length connecting rod 6, a combustion chamber 7, a spark plug 8 that is disposed in a center portion of a top surface of the combustion chamber 7, an intake valve 9, an intake camshaft 10, an intake port 11, an exhaust valve 12, an exhaust camshaft 13, and an exhaust port 14.

The variable length connecting rod 6 is connected to the piston 5 by a piston pin 21 at a small diameter end of the variable length connecting rod 6, and is connected to a crankpin 22 of a crankshaft at a large diameter end of the variable length connecting rod 6. In the variable length connecting rod 6, a distance from an axis of the piston pin 21 to an axis of the crankpin 22, that is, an effective length can be varied as described later.

When the effective length of the variable length connecting rod 6 is increased, a length from the crankpin 22 to the piston pin 21 is increased. Thus, a volume of the combustion chamber 7 when the piston 5 is at a top dead center is decreased as indicated by a solid line in FIG. 1. On the other hand, even when the effective length of the variable length connecting rod 6 is varied, a stroke length of the piston 5 reciprocating in a cylinder is not varied. Therefore, at this time, a mechanical compression ratio of the internal combustion engine 1 is increased.

On the other hand, when the effective length of the variable length connecting rod 6 is decreased, the length from the crankpin 22 to the piston pin 21 is decreased. Thus, the volume of the combustion chamber 7 when the piston 5 is at the top dead center is increased as indicated by a dashed line in FIG. 1. However, the stroke length of the piston 5 is constant as described above. Therefore, at this time, the mechanical compression ratio of the internal combustion engine 1 is decreased.

Figure 2:
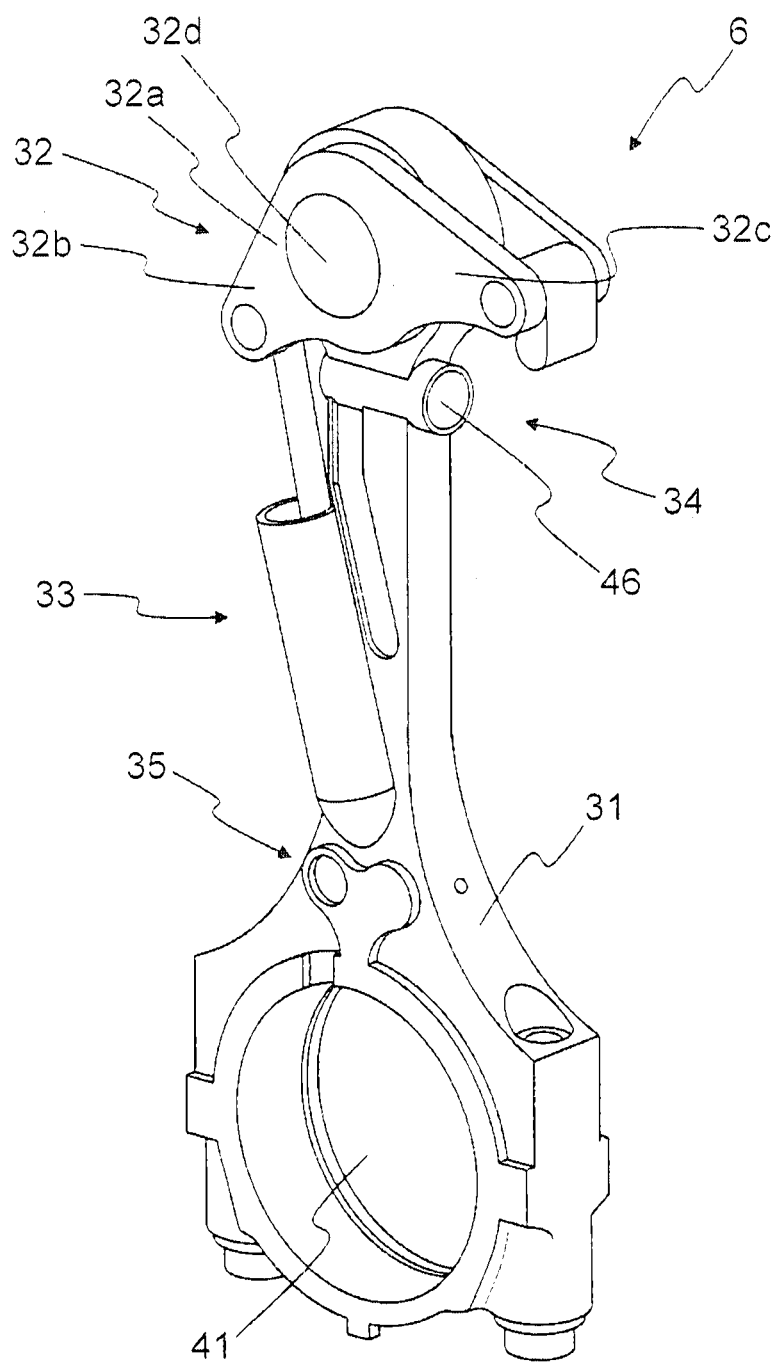
FIG. 2 is a perspective view schematically illustrating a variable length connecting rod according to a first embodiment.
Figure 3:
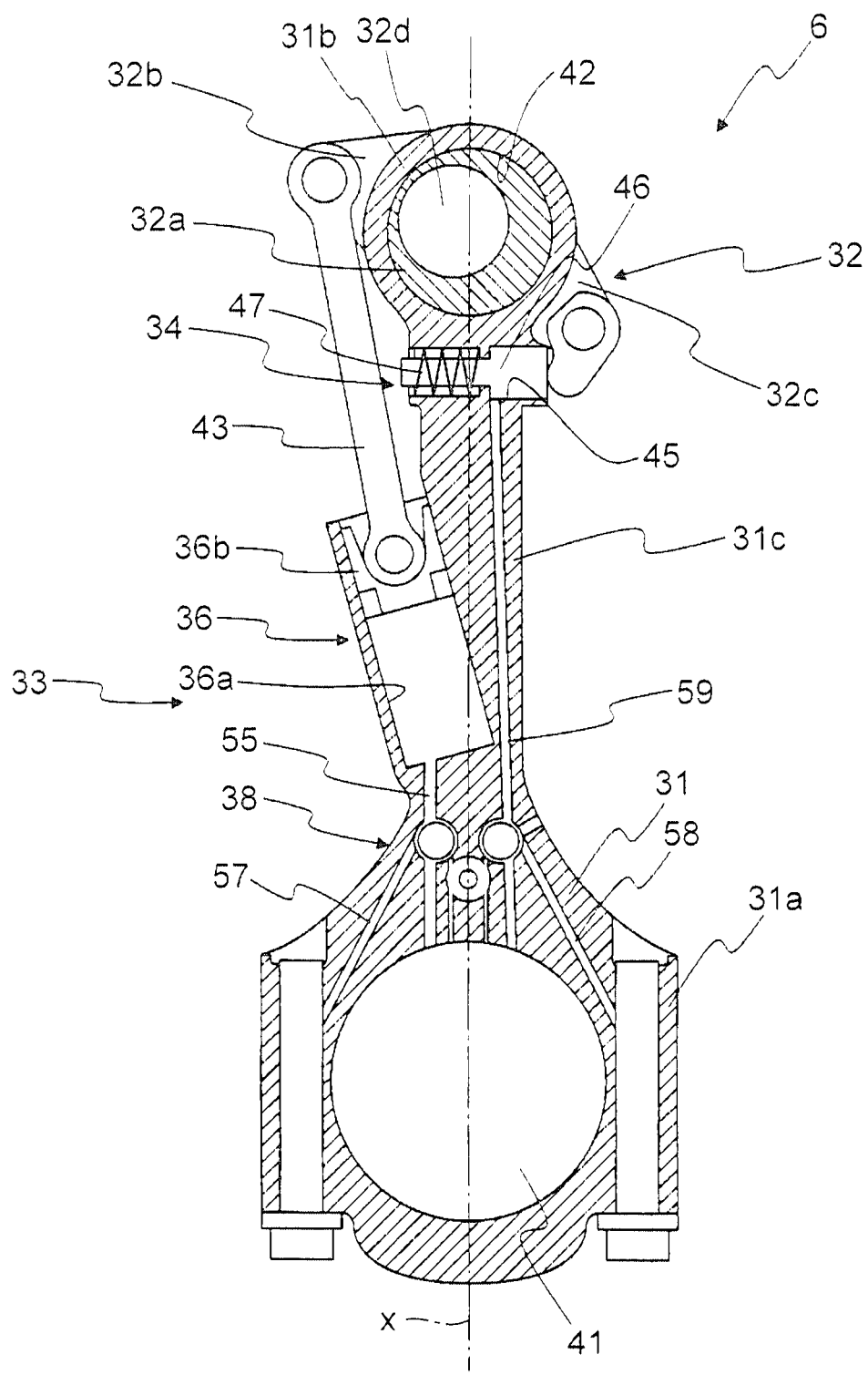
FIG. 3 is a sectional side view schematically illustrating the variable length connecting rod according to the first embodiment.

FIG. 2 is a perspective view schematically illustrating the variable length connecting rod 6 according to a first embodiment. FIG. 3 is a sectional side view schematically illustrating the variable length connecting rod 6 according to the first embodiment. As shown in FIGS. 2, 3, the variable length connecting rod 6 includes a connecting rod body 31, an eccentric member 32 that is rotatably mounted to the connecting rod body 31, a rotational-direction switching mechanism 33 that switches a rotational direction of the eccentric member 32, and an intermediate stopping mechanism 34 that can stop and maintain the eccentric member 32 at an intermediate rotational position.

First, the connecting rod body 31 will be described. The connecting rod body 31 has a first opening 41 that receives the crankpin 22 of the crankshaft at one of end portions, and a sleeve receiving opening 42 that receives a sleeve of the eccentric member 32 described below at the other of the end portions. The first opening 41 is larger than the sleeve receiving opening 42. Thus, the end portion of the connecting rod body 31 on a side where the first opening 41 is provided is referred to as a large diameter end 31a, and the end portion of the connecting rod body 31 on a side where the sleeve receiving opening 42 is provided is referred to as a small diameter end 31b. The connecting rod body also has a rod portion 31c that extends between the large diameter end 31a and the small diameter end 31b.

A line X (FIG. 3) extending between a center axis of the first opening 41 (that is, the axis of the crankpin 22 received in the first opening 41) and a center axis of the sleeve receiving opening 42 (that is, an axis of the sleeve received in the sleeve receiving opening 42), that is, a line extending in a longitudinal direction through the center of the connecting rod body 31 is referred to as a longitudinal axis of the connecting rod 6. A length of the connecting rod in a direction perpendicular to the longitudinal axis X of the connecting rod 6 and perpendicular to the center axis of the first opening 41 is referred to as a width of the connecting rod. Also, a length of the connecting rod in a direction parallel to the center axis of the first opening 41 is referred to as a thickness of the connecting rod.

As is understood from FIGS. 2, 3, a width of the connecting rod body 31 is smallest at an intermediate portion between the large diameter end 31a and the small diameter end 31b. A width of the large diameter end 31a is larger than a width of the small diameter end 31b. On the other hand, a thickness of the connecting rod body 31 is almost constant except for a region in which a piston mechanism 36 is provided.

Figure 4:
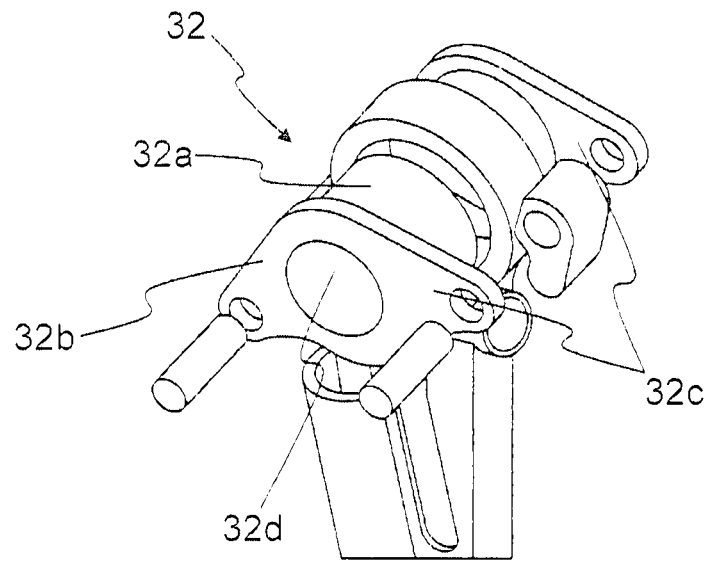
FIG. 4 is a schematic exploded perspective view of a region around a small diameter end of a connecting rod body.
Figure 5:
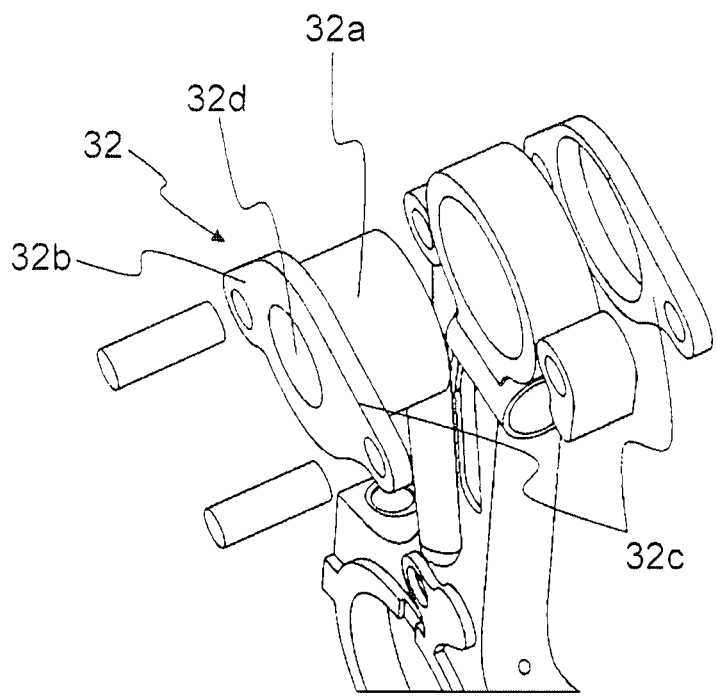
FIG. 5 is a schematic exploded perspective view of the region around the small diameter end of the connecting rod body.

Next, the eccentric member 32 will be described. FIGS. 4, 5 are schematic perspective views of a region around the small diameter end 31b of the connecting rod body 31. The eccentric member 32 is shown in an exploded state in FIGS. 4, 5. By referring to FIGS. 2 to 5, the eccentric member 32 includes a cylindrical sleeve 32a that is received in the sleeve receiving opening 42 formed in the connecting rod body 31, a pair of first arms 32b that extend in one direction in a width direction of the connecting rod body 31 from the sleeve 32a, and a pair of second arms 32c that extend in another direction (a direction roughly opposite to the above one direction) in the width direction of the connecting rod body 31 from the sleeve 32a. The sleeve 32a can rotate in the sleeve receiving opening 42. Thus, the eccentric member 32 is mounted to the connecting rod body 31 rotatably in a circumferential direction of the small diameter end 31b of the connecting rod body 31 at the small diameter end 31b.

The second arms 32c are curved so as to extend toward the large diameter end 31a of the connecting rod body 31 with respect to a radial direction of the eccentric member 32 (that is, a radial direction of the sleeve 32a) at an end portion opposite to the sleeve 32a-side (that is, the first arm 32b-side). Particularly, in the present embodiment, the second arms 32c are formed such that the end portion opposite to the sleeve 32a-side extends in a tangential direction of the sleeve 32a.

The sleeve 32a of the eccentric member 32 also has a second opening 32d that receives the piston pin 21. The second opening 32d is formed in a cylindrical shape. The cylindrical second opening 32d is formed such that an axis of the second opening 32d is parallel to but not coaxial with a center axis of a cylindrical outer shape of the sleeve 32a. Therefore, the center of the second opening 32d is eccentric from the center of the cylindrical outer shape of the sleeve 32a.

Particularly, in the present embodiment, the center of the second opening 32d of the sleeve 32a is eccentric from the center of the cylindrical outer shape of the sleeve 32a toward the first arms 32b. Therefore, when the eccentric member 32 rotates, a position of the second opening 32d in the sleeve receiving opening 42 is changed. When the eccentric member 32 rotates to one side such that the second opening 32d is positioned on the large diameter end 31a-side in the sleeve receiving opening 42, the effective length of the connecting rod is decreased. Conversely, when the eccentric member 32 rotates to the other side opposite to the one side such that the second opening 32d is positioned opposite to the large diameter end 31a-side in the sleeve receiving opening 42, the effective length of the connecting rod is increased. Therefore, in accordance with the present embodiment, the effective length of the connecting rod 6 is varied by rotating the eccentric member. Also, in the present embodiment, the eccentric member 32 can rotate between a first rotational position reached when the eccentric member 32 maximally rotates to the one side, and a second rotational position reached when the eccentric member 32 maximally rotates to the other side. Therefore, the effective length of the connecting rod 6 can be varied between a maximum length obtained when the eccentric member 32 is at the first rotational position and a minimum length obtained when the eccentric member 32 is at the second rotational position.

Next, the rotational-direction switching mechanism 33 will be described by reference to FIGS. 3, 6 to 8. The rotational-direction switching mechanism 33 is configured to be switchable between a first state in which rotation of the eccentric member 32 to one side is permitted, and rotating to the other side opposite to the one side is prohibited, and a second state in which the rotation of the eccentric member 32 to the other side is permitted, and the rotating to the one side is prohibited. The rotational-direction switching mechanism 33 includes the single piston mechanism 36 that is provided on the connecting rod body 31, and a flow-direction switching mechanism 38 that switches a flow of hydraulic oil to the piston mechanism 36.

First, the piston mechanism 36 will be described by reference to FIG. 3. The piston mechanism 36 has a hydraulic cylinder 36a that is formed in the connecting rod body 31, and a hydraulic piston 36b that slides in the hydraulic cylinder 36a. The hydraulic cylinder 36a is almost or entirely disposed on the first arm 32b-side with respect to the longitudinal axis X of the connecting rod 6. The hydraulic cylinder 36a is also disposed at a certain inclined angle with respect to the longitudinal axis X so as to project in the width direction of the connecting rod body 31 toward the small diameter end 31b. The hydraulic cylinder 36a also communicates with the flow-direction switching mechanism 38 via a piston communication oil passage 55.

The hydraulic piston 36b is connected to the first arms 32b of the eccentric member 32 by a first connection member 43. The hydraulic piston 36b is rotatably connected to the first connection member 43 by a pin. The first arms 32b are rotatably connected to the first connection member 43 by a pin at an end portion opposite to a side where the first arms 32b are coupled to the sleeve 32a. Therefore, when an operating position of the hydraulic piston 36b is changed, a rotational position of the eccentric member 32 is changed. In other words, it can be said that the hydraulic piston 36b is configured such that the operating position is changed along with a change in the rotational position of the eccentric member 32.

Figure 6:
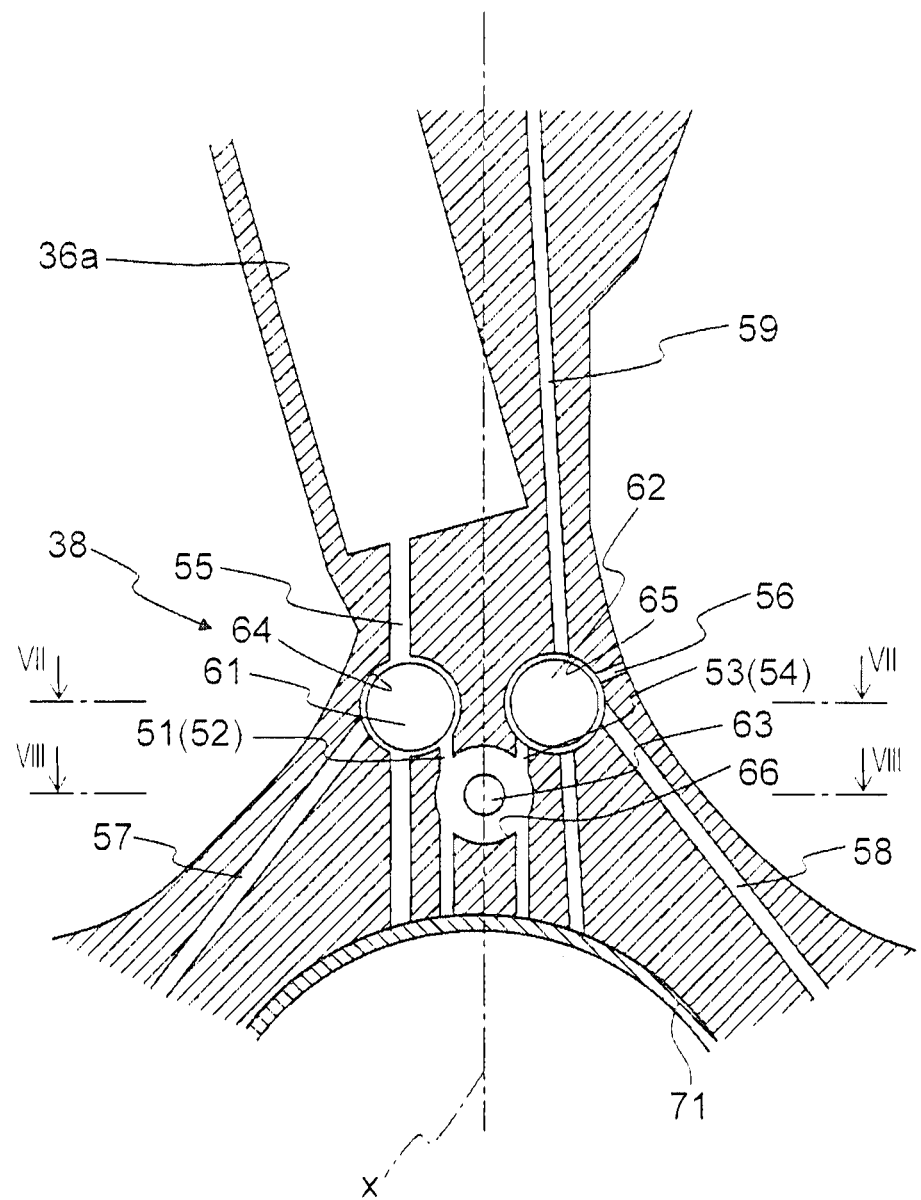
FIG. 6 is a sectional side view of the connecting rod illustrating an enlarged region in which a flow-direction switching mechanism is provided.
Figure 7:
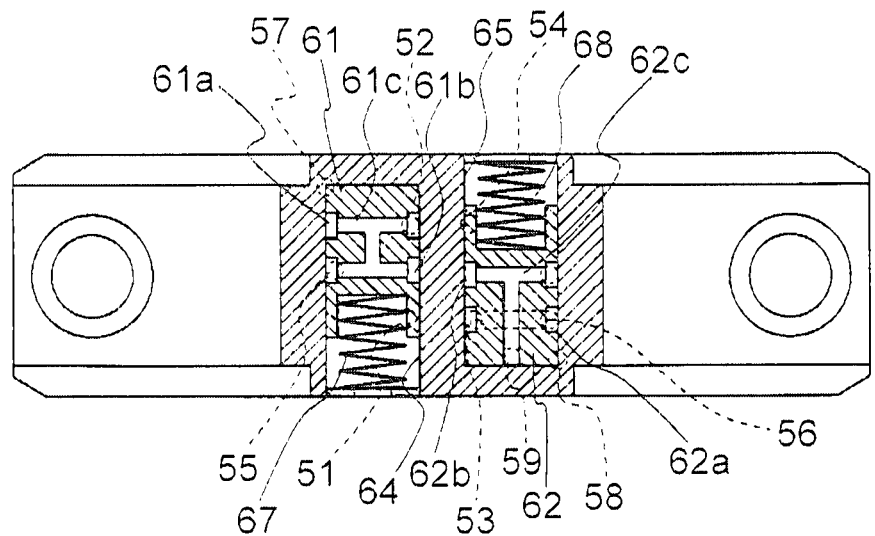
FIG. 7 is a sectional view of the connecting rod taken along VII-VII in FIG. 6.
Figure 8:
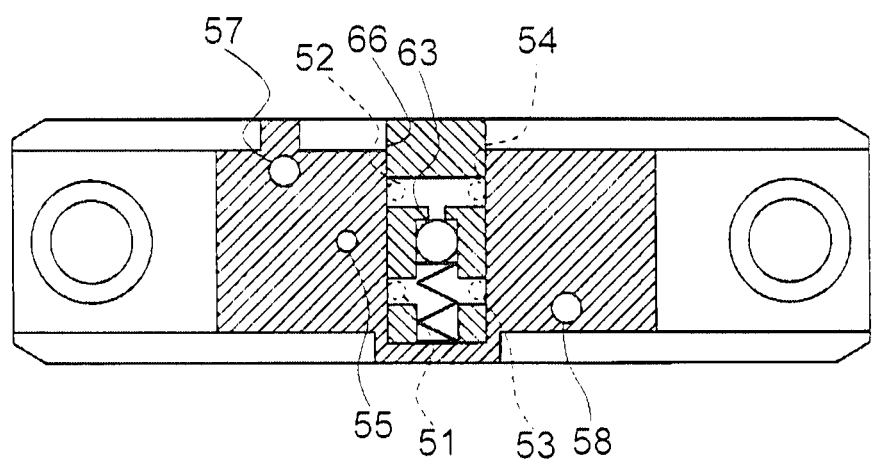
FIG. 8 is a sectional view of the connecting rod taken along VIII-VIII in FIG. 6.

Next, a configuration of the flow-direction switching mechanism 38 will be described by reference to FIGS. 6 to 8. FIG. 6 is a sectional side view of the connecting rod illustrating an enlarged region in which the flow-direction switching mechanism 38 is provided. FIG. 7 is a sectional view of the connecting rod taken along VII-VII in FIG. 6. FIG. 8 is a sectional view of the connecting rod taken along VIII-VIII in FIG. 6. The flow-direction switching mechanism 38 can switch the flow of hydraulic oil between a first state in which supply of the hydraulic oil to the hydraulic cylinder 36a from outside is permitted, but discharge of the hydraulic oil from the hydraulic cylinder 36a is prohibited, and a second state in which the supply of the hydraulic oil to the hydraulic cylinder 36a is prohibited, but the discharge of the hydraulic oil from the hydraulic cylinder 36a is permitted.

As shown in FIG. 6, the flow-direction switching mechanism 38 includes two switching pins 61, 62, and one check valve 63. The two switching pins 61, 62 and the check valve 63 are disposed between the hydraulic cylinder 36a and the first opening 41 in a direction of the axis X of the connecting rod body 31. The check valve 63 is disposed closer to the first opening 41 than the two switching pins 61, 62 in the direction of the axis X of the connecting rod body 31.

Moreover, the two switching pins 61, 62 are provided on opposite sides with respect to the axis X of the connecting rod body 31, and the check valve 63 is provided on the axis X. Accordingly, it is possible to suppress a decrease in bilateral weight balance of the connecting rod body 31 due to the switching pins 61, 62 and the check valve 63 provided in the connecting rod body 31.

The two switching pins 61, 62 are accommodated in cylindrical pin accommodating spaces 64, 65, respectively. In the present embodiment, the pin accommodating spaces 64, 65 are formed such that axes of the pin accommodating spaces 64, 65 extend parallel to the center axis of the first opening 41. The switching pins 61, 62 can slide in the pin accommodating spaces 64, 65 in directions in which the pin accommodating spaces 64, 65 extend. That is, the switching pins 61, 62 are disposed in the connecting rod body 31 such that operating directions of the switching pins 61, 62 are parallel to the center axis of the first opening 41.

The first pin accommodating space 64 that accommodates the first switching pin 61 out of the two pin accommodating spaces 64, 65 is formed as a pin accommodating hole that is opened to one of side surfaces of the connecting rod body 31 and is closed to the other of the side surfaces of the connecting rod body 31 as shown in FIG. 7. Also, the second pin accommodating space 65 that accommodates the second switching pin 62 out of the two pin accommodating spaces 64, 65 is formed as a pin accommodating hole that is opened to the other of the side surfaces of the connecting rod body 31 and is closed to the one of the side surfaces as shown in FIG. 7.

The first switching pin 61 has two circumferential grooves 61a, 61b that extend in a circumferential direction of the first switching pin 61. The circumferential grooves 61a, 61b are brought into communication with each other by a communication passage 61c that is formed in the first switching pin 61. A first urging spring 67 is also accommodated in the first pin accommodating space 64. The first switching pin 61 is urged in the direction parallel to the center axis of the first opening 41 by the first urging spring 67. Particularly, in an example shown in FIG. 7, the first switching pin 61 is urged toward a closed end portion of the first pin accommodating space 64.

Similarly, the second switching pin 62 has two circumferential grooves 62a, 62b that extend in a circumferential direction of the second switching pin 62. One of the circumferential grooves, that is, the circumferential groove 62b is brought into communication with one of end portions (an end portion on a side where a second urging spring 68 is not provided) of the second switching pin 62 by a communication passage 62c that is formed in the second switching pin 62. The second urging spring 68 is also accommodated in the second pin accommodating space 65. The second switching pin 62 is urged in the direction parallel to the center axis of the first opening 41 by the second urging spring 68. Particularly, in the example shown in FIG. 7, the second switching pin 62 is urged toward a closed end portion of the second pin accommodating space 65.

As a result, the second switching pin 62 is urged in a direction opposite to the first switching pin 61. Therefore, in the present embodiment, the operating directions of the first switching pin 61 and the second switching pin 62 are opposite to each other when a hydraulic pressure is supplied to the first switching pin 61 and the second switching pin 62.

The check valve 63 is accommodated in a cylindrical check valve accommodating space 66. In the present embodiment, the check valve accommodating space 66 is also formed so as to extend parallel to the center axis of the first opening 41. The check valve 63 can move in the check valve accommodating space 66 in a direction in which the check valve accommodating space 66 extends. Therefore, the check valve 63 is disposed in the connecting rod body 31 such that an operating direction of the check valve 63 is parallel to the center axis of the first opening 41. The check valve accommodating space 66 is formed as a check valve accommodating hole that is opened to one of the side surfaces of the connecting rod body 31, and is closed to the other of the side surfaces of the connecting rod body 31.

The check valve 63 is configured to permit a flow from a primary side (an upper side in FIG. 8) to a secondary side (a lower side in FIG. 8), and prohibit a flow from the secondary side to the primary side.

The first pin accommodating space 64 that accommodates the first switching pin 61 is brought into communication with the check valve accommodating space 66 via two space communication oil passages 51, 52. One of the space communication oil passages, that is, the first space communication oil passage 51 is brought into communication with the first pin accommodating space 64 and the secondary side of the check valve accommodating space 66 on one of the side surface sides (a lower side in FIG. 7) with respect to the center in a thickness direction of the connecting rod body 31 as shown in FIG. 7. The other of the space communication oil passages, that is, the second space communication oil passage 52 is brought into communication with the first pin accommodating space 64 and the primary side of the check valve accommodating space 66 on the other of the side surface sides (an upper side in FIG. 7) with respect to the center in the thickness direction of the connecting rod body 31.

The second pin accommodating space 65 that accommodates the second switching pin 62 is brought into communication with the check valve accommodating space 66 via two space communication oil passages 53, 54. One of the space communication oil passages, that is, the third space communication oil passage 53 is brought into communication with the second pin accommodating space 65 and the secondary side of the check valve accommodating space 66 on one of the side surface sides (the lower side in FIG. 7) with respect to the center in the thickness direction of the connecting rod body 31 as shown in FIG. 7. The other of the space communication oil passages, that is, the fourth space communication oil passage 54 is brought into communication with the second pin accommodating space 65 and the primary side of the check valve accommodating space 66 on the other of the side surface sides (the upper side in FIG. 7) with respect to the center in the thickness direction of the connecting rod body 31.

The first pin accommodating space 64 that accommodates the first switching pin 61 is brought into communication with the hydraulic cylinder 36a via the piston communication oil passage 55. As shown in FIG. 7, the piston communication oil passage 55 is brought into communication with the first pin accommodating space 64 at around the center in the thickness direction of the connecting rod body 31. The piston communication oil passage 55 is also disposed such that an interval in the thickness direction of the connecting rod body between the first space communication oil passage 51 and the piston communication oil passage 55, and an interval in the thickness direction of the connecting rod body between the second space communication oil passage 52 and the piston communication oil passage 55 are equal to an interval in the thickness direction of the connecting rod body between the circumferential grooves 61a, 61b.

A discharge oil passage 56 that communicates with the outside of the connecting rod body 31 is also brought into communication with the second pin accommodating space 65 that accommodates the second switching pin 62. As shown in FIG. 7, the discharge oil passage 56 is disposed at the same position as the third space communication oil passage 53 in an axial direction of the second pin accommodating space 65. That is, the discharge oil passage 56 is configured to communicate with the circumferential groove 62a of the second switching pin 62 at the same time as when the circumferential groove 62a communicates with the third space communication oil passage 53.

The oil passages 51 to 55 described above are formed by performing cutting by a drill or the like from the first opening 41. Therefore, the oil passages 51 to 55 extend to the first opening 41. In other words, the oil passages 51 to 55 are formed such that the first opening 41 is positioned on extended lines of the oil passages 51 to 55. The oil passages 51 to 55 are closed by, for example, a bearing metal 71.

As described above, all of the oil passages 51 to 55 are closed by the bearing metal 71. Therefore, only by attaching the connecting rod 6 to the crankpin 22 by using the bearing metal 71, the oil passages 51 to 55 can be closed without separately performing a process for closing the oil passages 51 to 55.

A first control oil passage 57 that supplies the hydraulic pressure to the first switching pin 61 and a second control oil passage 58 that supplies the hydraulic pressure to the second switching pin 62 are also formed in the connecting rod body 31. The first control oil passage 57 is brought into communication with the first pin accommodating space 64 at an end portion opposite to an end portion where the first urging spring 67 is provided. The second control oil passage 58 is brought into communication with the second pin accommodating space 65 at an end portion opposite to an end portion where the second urging spring 68 is provided. The control oil passages 57, 58 are formed so as to communicate with the first opening 41. The control oil passages 57, 58 also communicate with an external hydraulic pressure supply source (a hydraulic pump) via an oil passage (not shown) that is formed in the crankpin 22.

Therefore, when the hydraulic pressure supplied from the external hydraulic pressure supply source has a value lower than a predetermined first threshold value, the first switching pin 61 and the second switching pin 62 are urged by the first urging spring 67 and the second urging spring 68, and are positioned on the closed end portion sides in the pin accommodating spaces 64, 65, respectively, as shown in FIG. 7. On the other hand, when the hydraulic pressure supplied from the external hydraulic pressure supply source has the first threshold value or higher, the first switching pin 61 and the second switching pin 62 are moved against urging forces of the first urging spring 67 and the second urging spring 68, and are positioned on open end portion sides in the pin accommodating spaces 64, 65, respectively.

Next, the intermediate stopping mechanism 34 will be described by reference to FIG. 3. The intermediate stopping mechanism 34 can maintain the eccentric member 32 at the intermediate rotational position between the first rotational position and the second rotational position described above by abutting against the eccentric member 32 when the eccentric member 32 is at the intermediate rotational position.

The intermediate stopping mechanism 34 includes a stopping cylinder 45 that is formed in the connecting rod body 31, and a stopping member 46 that can slide in the stopping cylinder 45. In an example shown in FIG. 3, the stopping cylinder 45 and the stopping member 46 are disposed such that axes of the stopping cylinder 45 and the stopping member 46 extend in the width direction of the connecting rod body 31 (the direction perpendicular to the longitudinal axis X of the connecting rod 6 and perpendicular to the center axis of the first opening 41). Therefore, the stopping member 46 slides in the width direction of the connecting rod body 31. However, the stopping cylinder 45 and the stopping member 46 may be also disposed with a certain angle with respect to the width direction of the connecting rod body 31.

The intermediate stopping mechanism 34 is disposed on the small diameter end 31b-side in the rod portion 31c of the connecting rod body 31. That is, the intermediate stopping mechanism 34 is disposed close to the small diameter end 31b. Therefore, even when the second arms 32c of the eccentric member 32 are not very long, the stopping member 46 of the intermediate stopping mechanism 34 can abut against the second arms 32c. Thus, the second arms 32c of the eccentric member 32 can be shortened, so that the eccentric member 32 can be compactly configured. The second arms 32c are also curved so as to extend toward the large diameter end 31a of the connecting rod body 31 as described above. It is thus not necessary to cause the stopping member 46 that comes into contact with the second arms 32c to unnecessarily project, so that the stopping member 46 can be compactly configured.

The stopping member 46 can slide between a projecting position where the stopping member 46 at least partially projects from the connecting rod body 31 on the second arm 32c-side of the eccentric member 32, and a retracted position where the stopping member 46 is at least mostly accommodated in the connecting rod body 31 (that is, in the stopping cylinder 45).

The stopping member 46 is disposed so as to abut against the second arms 32c of the eccentric member 32 at both of the projecting position and the retracted position. Here, in the present embodiment, the intermediate stopping mechanism 34 is configured such that the stopping member 46 abuts against the second arms 32c, not the first arms 32b connected to the hydraulic piston 36b. Therefore, the intermediate stopping mechanism 34 can be configured so as not to interfere with the hydraulic piston 36b. In the present embodiment, the stopping member 46 slides in an axial direction of the stopping member 46, and also abuts against the second arms 32c on an extended line of the axial direction. Therefore, a force in the axial direction is basically applied to the stopping member 46. Durability of the stopping member 46 is thereby improved.

The intermediate stopping mechanism 34 includes an urging spring 47 that urges the stopping member 46 to the retracted position. The stopping cylinder 45 of the intermediate stopping mechanism 34 is brought into communication with the second pin accommodating space 65 via a hydraulic pressure supply oil passage 59. The hydraulic pressure supply oil passage 59 is brought into communication with the second pin accommodating space 65 at the end portion on the side where the second control oil passage 58 is connected to the second pin accommodating space 65 as shown in FIG. 7. Therefore, the same hydraulic pressure as that of the second control oil passage 58 is supplied to the hydraulic pressure supply oil passage 59. Note that the hydraulic pressure supply oil passage 59 is also formed by performing cutting by a drill or the like from the first opening 41. Therefore, the hydraulic pressure supply oil passage 59 also extends to the first opening 41, and is closed by the bearing metal 71 as shown in FIG. 6.

In the intermediate stopping mechanism 34 having the above configuration, when a high hydraulic pressure having a second threshold value or higher is not supplied to the stopping cylinder 45 through the hydraulic pressure supply oil passage 59, the stopping member 46 is retracted to the retracted position by an action of the urging spring 47. On the other hand, when a high hydraulic pressure having the second threshold value or higher is supplied to the stopping cylinder 45 through the hydraulic pressure supply oil passage 59, the stopping member 46 is moved to the projecting position by an action of hydraulic oil supplied into the stopping cylinder 45.

Figure 9:
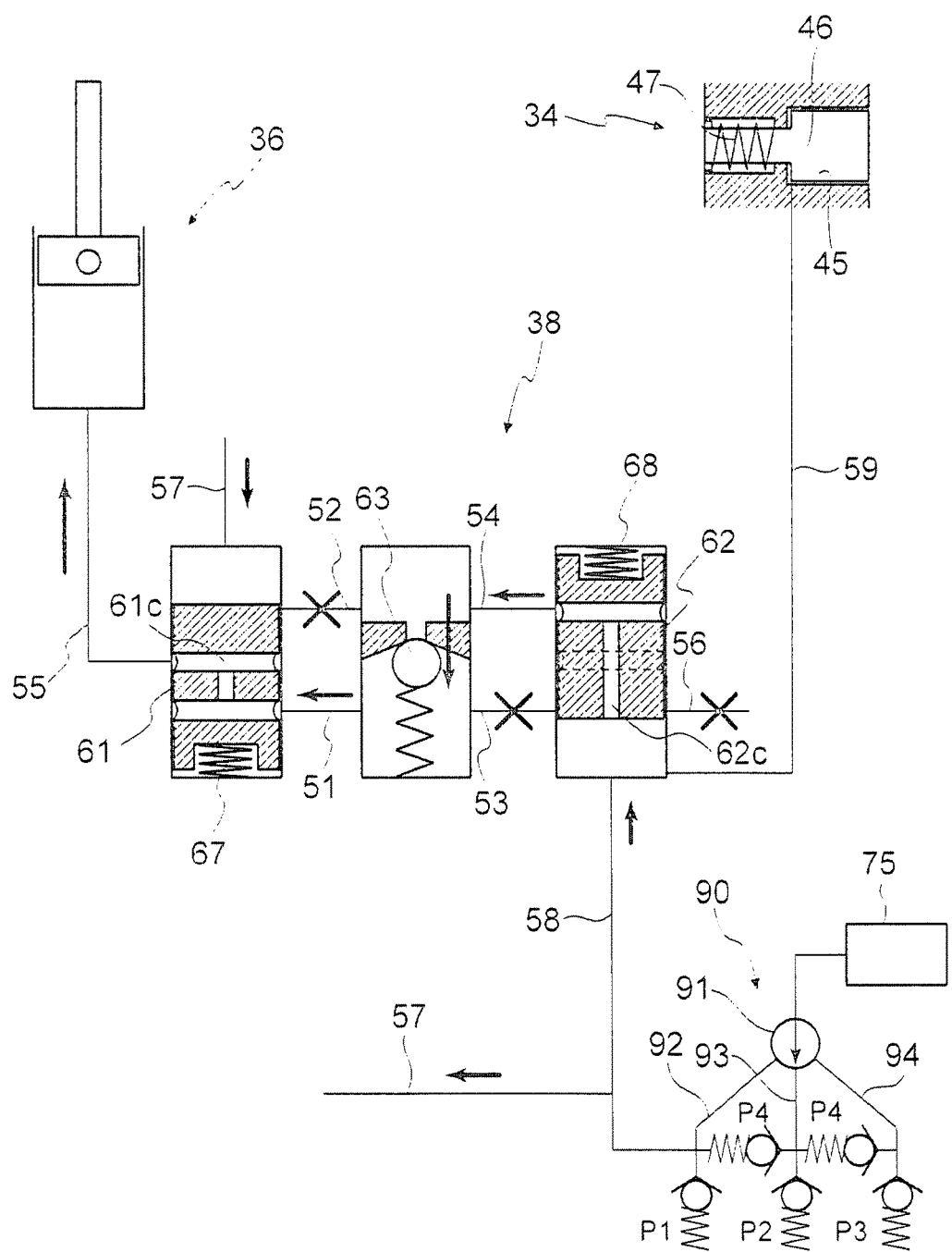
Figure 10:
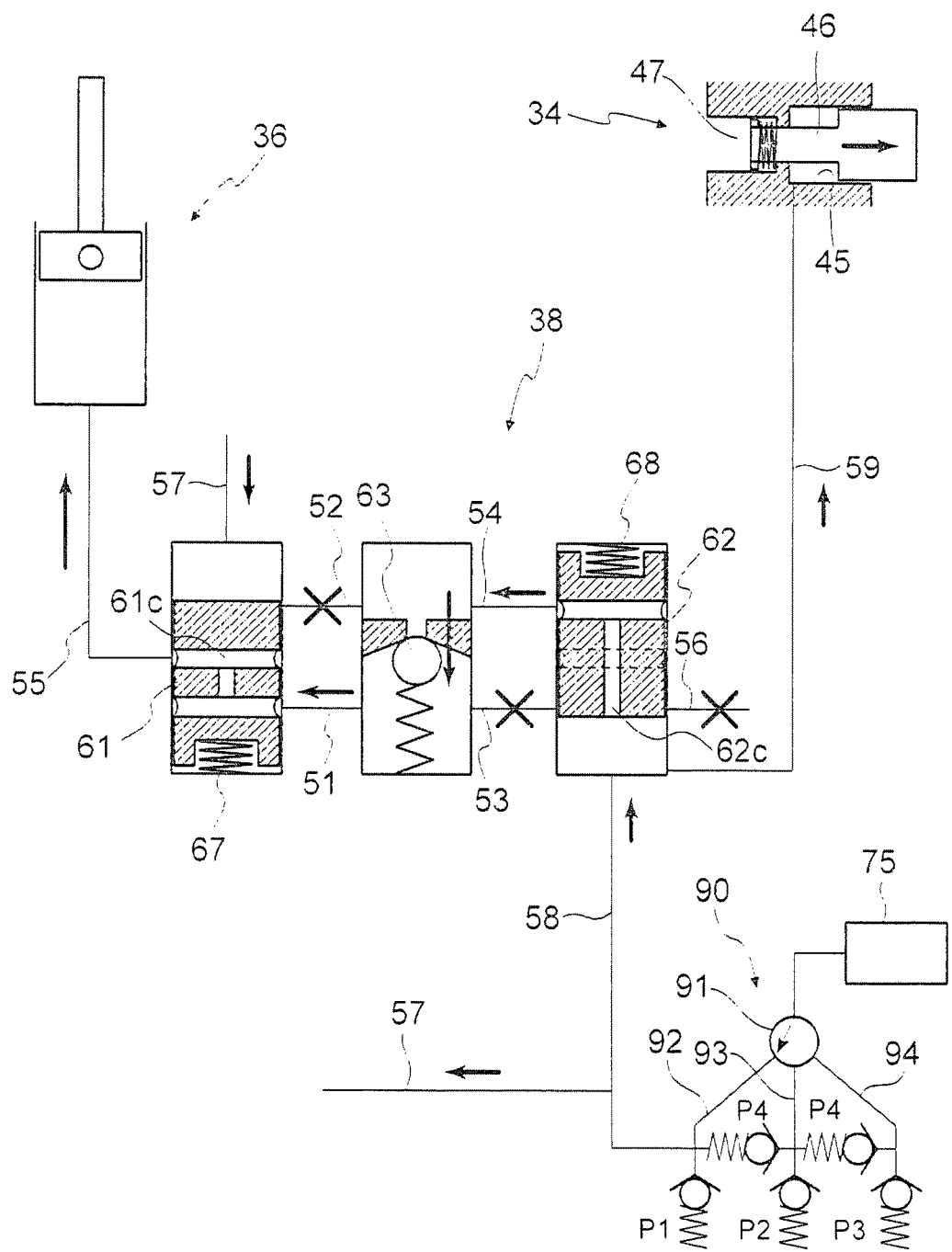
Figure 11:
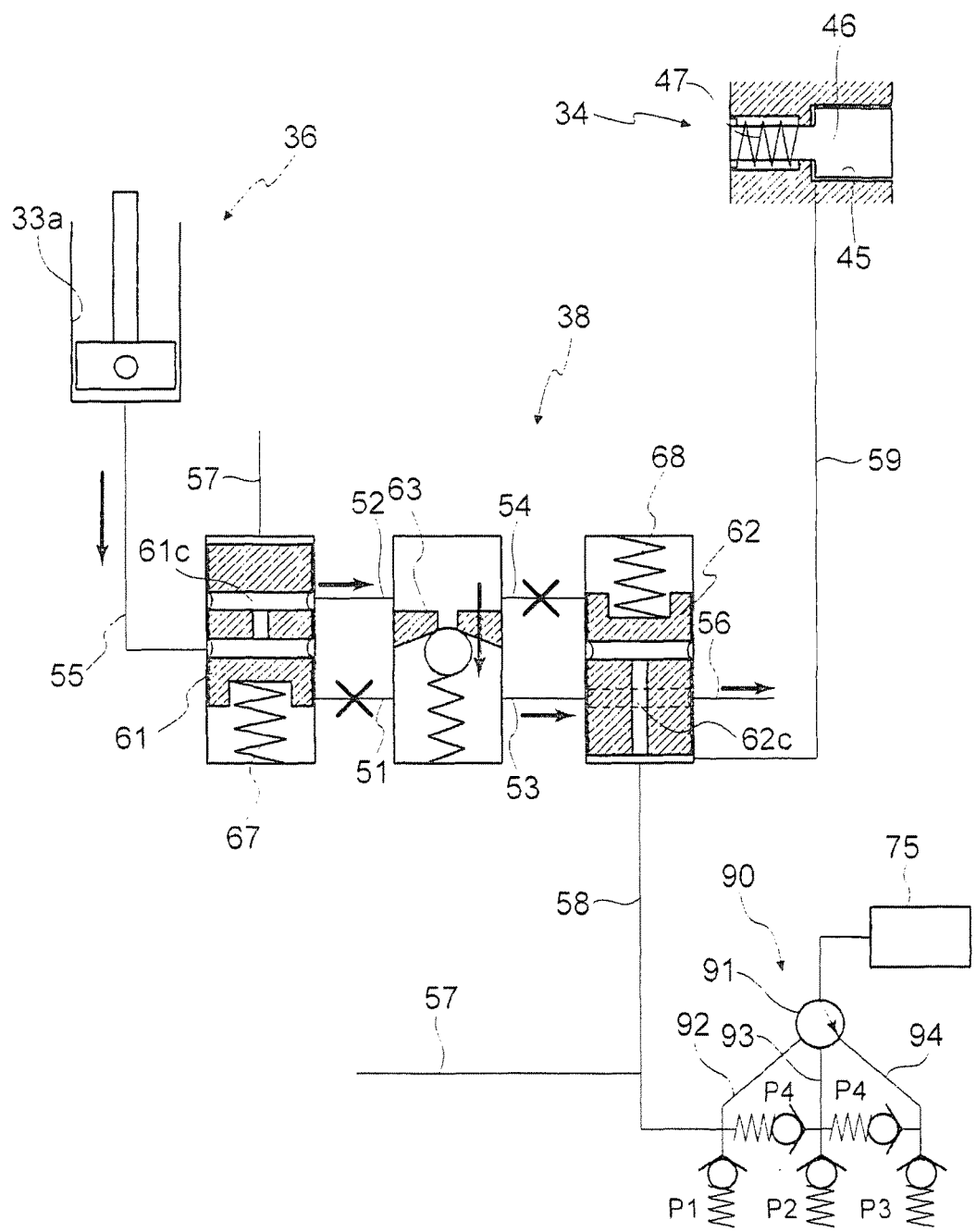
Figure 12:
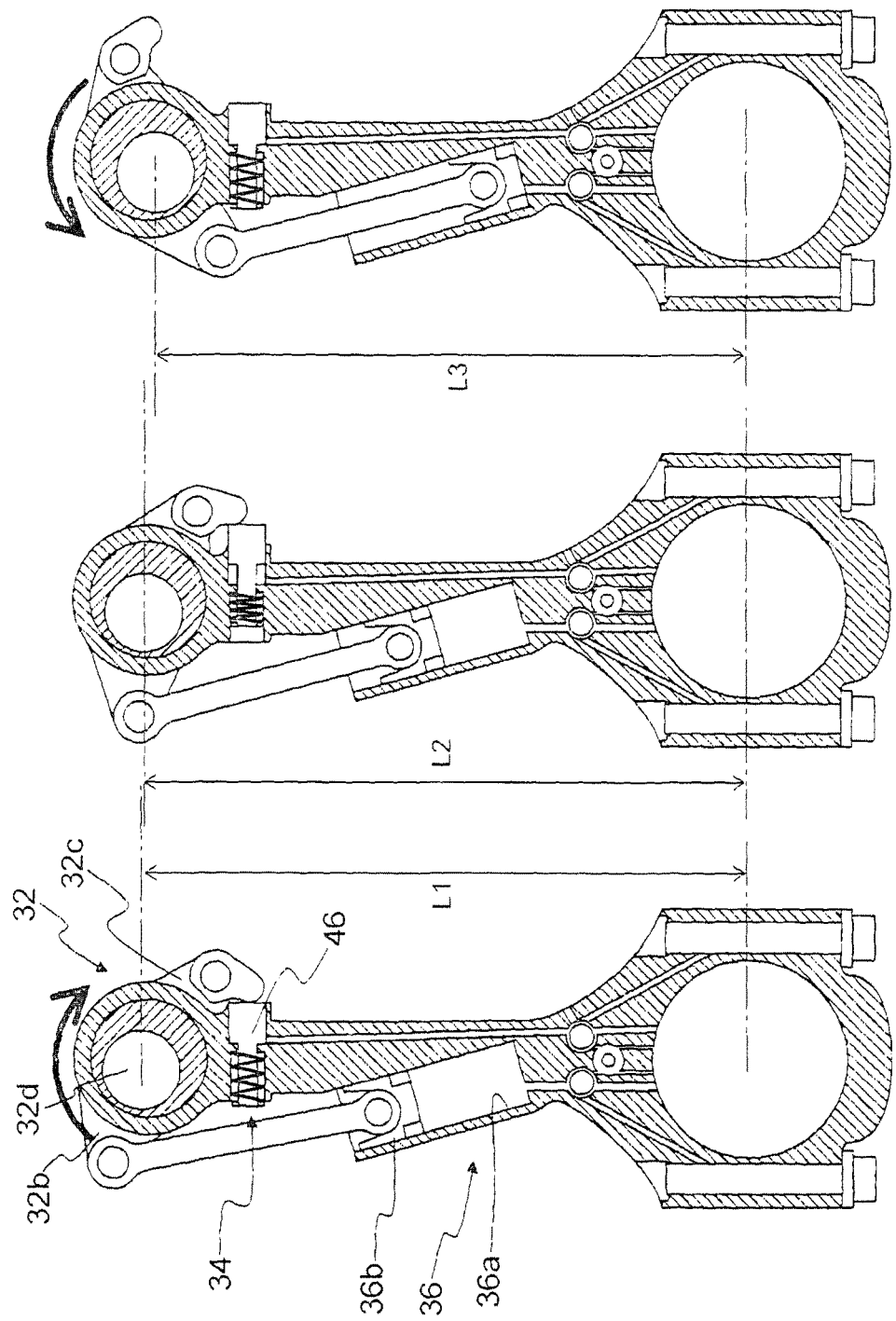
FIGS. 12A to 12C are sectional side views schematically illustrating the variable length connecting rod according to the first embodiment.
Figure 13:
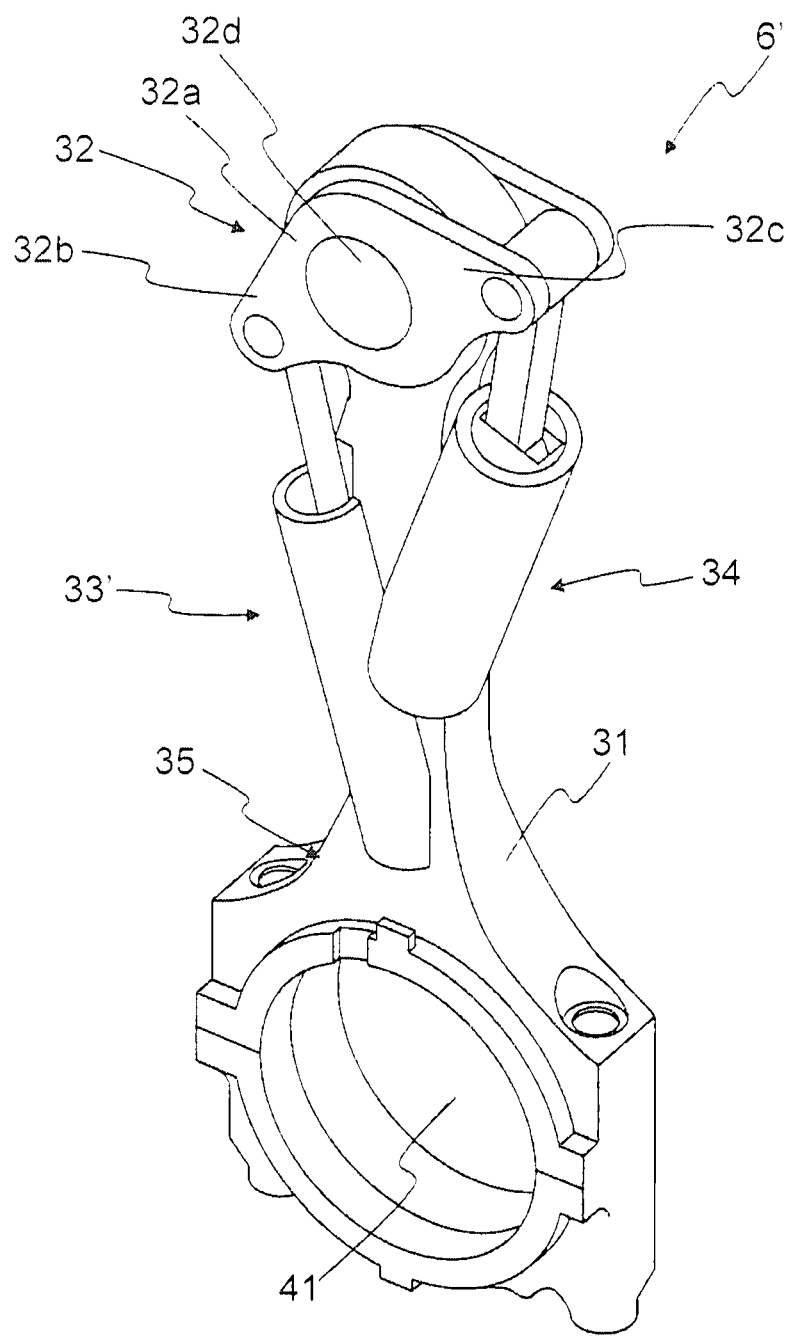
FIG. 13 is a perspective view similar to FIG. 2 schematically illustrating a variable length connecting rod according to a second embodiment.

Next, an operation of the variable length connecting rod 6 according to the present embodiment will be described by reference to FIGS. 9 to 12C. FIG. 9 is a schematic view for explaining the operation of the variable length connecting rod 6 when a medium hydraulic pressure is supplied to the switching pins 61, 62 and the stopping member 46. FIGS. 10, 11 are schematic views for explaining the operation of the variable length connecting rod 6 when a high hydraulic pressure is supplied to the switching pins 61, 62 and the stopping member 46, and when a low hydraulic pressure is supplied to the switching pins 61, 62 and the stopping member 46, respectively. FIGS. 12A to 12C are sectional side views schematically illustrating the variable length connecting rod according to the present embodiment. Particularly, FIGS. 12A, 12B, 12C show a state in which the medium hydraulic pressure is supplied to the switching pins or the like, a state in which the high hydraulic pressure is supplied to the switching pins or the like, and a state in which the low hydraulic pressure is supplied to the switching pins or the like, respectively.

Note that the hydraulic oil is supplied to the first switching pin, the second switching pin 62 of the flow-direction switching mechanism 38 and the stopping member 46 from one hydraulic pressure supply source 75 in the present embodiment. Thus, the hydraulic oil supplied to the first switching pin 61, the second switching pin 62 and the hydraulic oil supplied the stopping member 46 have the same pressure.

Here, operating positions of the first switching pin 61 and the second switching pin 62 are switched depending on whether the supplied hydraulic pressure has the first threshold value or higher as described above. That is, the pressure of the hydraulic oil at which the flow-direction switching mechanism 38, and therefore, the rotational-direction switching mechanism 33 are switched between the first state and the second state has the first threshold value. The first threshold value varies according to a sectional area of the switching pins 61, 62 (or a sectional area of the pin accommodating spaces 64, 65), an elastic coefficient of the urging springs 67, 68, or the like. Also, an operating position of the stopping member 46 is switched depending on whether the supplied hydraulic pressure has the second threshold value or higher as described above. The second threshold value varies according to a sectional area of the stopping member 46 (or a sectional area of the stopping cylinder 45), an elastic coefficient of the urging spring 47, or the like. In the present embodiment, the first threshold value is smaller than the second threshold value. Therefore, when the pressure of the hydraulic oil supplied from the hydraulic pressure supply source 75 is increased, the operating positions of the first switching pin 61 and the second switching pin 62 are switched first, so that the flow-direction switching mechanism 38 is changed from the second state to the first state. After that, when the pressure of the hydraulic oil supplied from the hydraulic pressure supply source 75 is further increased, the operating position of the stopping member 46 is changed from the retracted position to the projecting position.

In the present embodiment, a hydraulic pressure switching mechanism 90 is also provided between the hydraulic pressure supply source 75 and the control oil passages 57, 58. The hydraulic pressure switching mechanism 90 includes a three-way valve 91 that communicates with the hydraulic pressure supply source 75, and three oil passages 92 to 94 that communicate with the three-way valve 91. Each of the three oil passages 92 to 94 is provided with a relief valve. The relief valves have different release pressures from each other. In examples shown in FIGS. 9 to 11, the release pressures are lowered in the order of a release pressure P1 of the relief valve provided in the oil passage 92, a release pressure P2 of the relief valve provided in the oil passage 93, and a release pressure P3 of the relief valve provided in the oil passage 94 (P1>P2>P3). A relief valve that is released when a pressure in the oil passage 93 is increased is provided between the oil passage 92 and the oil passage 93. A relief valve that is released when a pressure in the oil passage 94 is increased is provided between the oil passage 93 and the oil passage 94. A release pressure P4 of the relief valve provided between the respective oil passages is set to be lower than the release pressure P3 of the relief valve provided in the oil passage 94 (P3>P4). The oil passage 92 communicates with the control oil passages 57, 58.

In the hydraulic pressure switching mechanism 90 having the above configuration, the hydraulic pressure supplied to the control oil passages 57, 58 and the hydraulic pressure supply oil passage 59 is changed by switching the three-way valve 91 that functions as a switching valve for switching the flow of the hydraulic oil. To be more specific, when the hydraulic pressure supply source 75 is brought into communication with the oil passage 92 by the three-way valve 91, the supplied hydraulic pressure becomes highest. In the present embodiment, the hydraulic pressure at this time is higher than the second threshold value. When the hydraulic pressure supply source 75 is brought into communication with the oil passage 93 by the three-way valve 91, the supplied hydraulic pressure has a medium level. In the present embodiment, the hydraulic pressure at this time is higher than the first threshold value and lower than the second threshold value. When the hydraulic pressure supply source 75 is brought into communication with the oil passage 94 by the three-way valve 91, the supplied hydraulic pressure becomes lowest. In the present embodiment, the hydraulic pressure at this time is lower than the first threshold value. In accordance with the present embodiment, since the hydraulic pressure switching mechanism 90 is used, the hydraulic pressure supplied to the control oil passages 57, 58 and the hydraulic pressure supply oil passage 59 is changed only by switching the three-way valve 91. Thus, as compared to a case in which the supplied hydraulic pressure is changed by, for example, changing an output of the hydraulic pump, the hydraulic pressure supplied to the control oil passages 57, 58 and the hydraulic pressure supply oil passage 59 can be quickly changed.

First, as shown in FIG. 9, when the hydraulic pressure supply source 75 is brought into communication with the oil passage 93 by the three-way valve 91 of the hydraulic pressure switching mechanism 90, the hydraulic pressure supplied to the control oil passages 57, 58 and the hydraulic pressure supply oil passage 59 is set to a medium pressure higher than the first threshold value and lower than the second threshold value. Since the hydraulic pressure at this time is higher than the first threshold value, the switching pins 61, 62 are moved against the urging of the urging springs 67, 68 to be positioned at first positions, respectively. As a result, the piston communication oil passage 55 and the first space communication oil passage 51 are brought into communication with each other by the communication passage 61c of the first switching pin 61. The hydraulic pressure supply source 75 and the fourth space communication oil passage 54 are also brought into communication with each other by the communication passage 62c of the second switching pin 62. Therefore, the hydraulic cylinder 36a is connected to the secondary side of the check valve 63, and the hydraulic pressure supply source 75 is connected to the primary side of the check valve 63.

Here, the check valve 63 is configured to permit the flow of the hydraulic oil from the primary side with which the second space communication oil passage 52 and the fourth space communication oil passage 54 communicate, to the secondary side with which the first space communication oil passage 51 and the third space communication oil passage 53 communicate, but prohibit the opposite flow. Therefore, in a state shown in FIG. 9, while the hydraulic oil flows from the fourth space communication oil passage 54 to the first space communication oil passage 51, the hydraulic oil does not flow oppositely.

As a result, in the state shown in FIG. 9, the hydraulic oil in the hydraulic pressure supply source 75 can be supplied to the hydraulic cylinder 36a through the oil passages in the order of the fourth space communication oil passage 54, the first space communication oil passage 51, and the piston communication oil passage 55. However, the hydraulic oil in the hydraulic cylinder 36a cannot be discharged from the hydraulic cylinder 36a. Therefore, it can be said that the flow-direction switching mechanism 38 is in the first state in which the supply of the hydraulic oil to the hydraulic cylinder 36a from the external hydraulic pressure supply source 75 is permitted, but the discharge of the hydraulic oil from the hydraulic cylinder 36a is prohibited when the supplied hydraulic pressure is set to the pressure higher than the first threshold value and lower than the second threshold value by the hydraulic pressure switching mechanism 90.

When the flow-direction switching mechanism 38 is in the first state, the supply of the hydraulic oil into the hydraulic cylinder 36a is permitted. When the hydraulic oil is supplied into the hydraulic cylinder 36a, the eccentric member 32 is rotated in a direction indicated by an arrow in FIG. 12A. On the other hand, when the flow-direction switching mechanism 38 is in the first state, the discharge of the hydraulic oil from the hydraulic cylinder 36a is prohibited. When the discharge of the hydraulic oil from the hydraulic cylinder 36a is prohibited, the eccentric member 32 cannot be rotated in a direction opposite to the direction indicated by the arrow in FIG. 12A. Therefore, the rotational-direction switching mechanism 33 is in the first state in which the rotation of the eccentric member 32 to the first rotational position is permitted, and the rotating to the second rotational position is prohibited.

When the rotational-direction switching mechanism 33 is in the first state as described above, the hydraulic oil in the hydraulic pressure supply source 75 is supplied to the hydraulic cylinder 36a, so that the hydraulic piston 36b moves up. When an upward inertial force is applied to the piston 5 with the piston 5 reciprocating in the cylinder of the internal combustion engine 1, the hydraulic piston 36b also moves up.

On the other hand, when a downward inertial force is applied to the piston 5 with the piston 5 reciprocating in the cylinder of the internal combustion engine 1, or a downward force is applied to the piston 5 with an air-fuel mixture being combusted in the combustion chamber 7, the hydraulic piston 36b is to move down. However, since the discharge of the hydraulic oil from the hydraulic cylinder 36a is prohibited by the flow-direction switching mechanism 38, the hydraulic oil in the hydraulic cylinder 36a does not flow out. Thus, the hydraulic piston 36b is not moved down. As a result, the effective length of the connecting rod 6 is kept long.

As a result, in a case shown in FIGS. 9, 12A, the hydraulic piston 36b moves up, and the first arms 32b of the eccentric member 32 connected to the hydraulic piston 36b also move up. Thus, as shown in FIG. 12A, the eccentric member 32 is rotated in the direction of the arrow in FIG. 12A, and the position of the second opening 32d is resultantly raised. Therefore, a length between the center of the first opening 41 and the center of the second opening 32d, that is, the effective length of the connecting rod 6 is increased to L1 in FIG. 12A. That is, when the hydraulic oil is supplied at the pressure higher than the first threshold value and lower than the second threshold value by the hydraulic pressure supply source 75 and the hydraulic pressure switching mechanism 90, the effective length of the connecting rod 6 is increased. Note that the rotation of the eccentric member 32 in the direction of the arrow in FIG. 12A at this time is stopped with the curved end portion of the second anus 32c of the eccentric member 32 abutting against a side surface of the connecting rod body 31.

On the other hand, since the hydraulic pressure at this time is lower than the second threshold value, the stopping member 46 is at the retracted position as shown in FIG. 9. Therefore, when the medium hydraulic pressure is supplied from the hydraulic pressure supply source 75, the effective length of the connecting rod 6 is increased as indicated by L1 in FIG. 12A.

As shown in FIG. 10, when the hydraulic pressure supply source 75 is brought into communication with the oil passage 92 by the three-way valve 91 of the hydraulic pressure switching mechanism 90, the hydraulic pressure supplied to the control oil passages 57, 58 and the hydraulic pressure supply oil passage 59 is set to a pressure higher than the second threshold value. Thus, the hydraulic pressure at this time is higher than the first threshold value. Therefore, the switching pins 61, 62 are moved against the urging of the urging springs 67, 68 to be positioned at the first positions, respectively, similarly to the state shown in FIG. 9. Consequently, the flow-direction switching mechanism 38 is in the first state, and the hydraulic piston 36b moves up.

On the other hand, since the hydraulic pressure at this time is higher than the second threshold value, the stopping member 46 is moved to the projecting position as shown in FIG. 10. Therefore, the eccentric member 32 comes into abutment against the stopping member 46 before reaching the first rotational position (the rotational position reached when the eccentric member 32 is maximally rotated in the direction indicated by the arrow in FIG. 12A). Accordingly, the eccentric member 32 cannot rotate anymore, and is stopped and maintained at the intermediate rotational position between the first rotational position and the second rotational position. Therefore, when the high hydraulic pressure is supplied from the hydraulic pressure supply source 75, the effective length of the connecting rod 6 becomes a medium length as indicated by L2 in FIG. 12B.

Note that the high hydraulic pressure is supplied to the hydraulic cylinder 36a in order to increase the effective length of the connecting rod 6 at this time. That is, in accordance with the present embodiment, when the rotational-direction switching mechanism is in the first state, the stopping member 46 is moved to the projecting position. Therefore, even when a large downward force is applied to the piston 5 with an air-fuel mixture being combusted in the combustion chamber 7, the discharge of the hydraulic oil from the hydraulic cylinder 36a is prohibited. Accordingly, even when the large downward force is applied in association with the combustion of the air-fuel mixture, the effective length of the connecting rod 6 can be kept at a medium level as indicated by L2 in FIG. 12B.

On the other hand, as shown in FIG. 11, when the hydraulic pressure supply source 75 is brought into communication with the oil passage 94 by the three-way valve 91 of the hydraulic pressure switching mechanism 90, the hydraulic pressure supplied to the control oil passages 57, 58 and the hydraulic pressure supply oil passage 59 is set to a pressure lower than the first threshold value. Therefore, the switching pins 61, 62 are urged by the urging springs 67, 68 to be positioned at second positions, respectively, as shown in FIG. 11. As a result, the piston communication oil passage 55 and the second space communication oil passage 52 are brought into communication with each other by the communication passage 61c of the first switching pin 61. The third space communication oil passage 53 and the discharge oil passage 56 are also brought into communication with each other by the circumferential groove 62a of the second switching pin 62. Therefore, the hydraulic cylinder 36a is connected to the primary side of the check valve 63, and the discharge oil passage 56 is connected to the secondary side of the check valve 63.

In a state shown in FIG. 11, the hydraulic oil in the hydraulic cylinder 36a can be discharged outside through the oil passages in the order of the piston communication oil passage 55, the second space communication oil passage 52, the third space communication oil passage 53, and the discharge oil passage 56 by the action of the check valve 63 described above. However, the hydraulic oil cannot be supplied to the hydraulic cylinder 36a from the discharge oil passage 56 by the action of the check valve 63. Therefore, it can be said that the flow-direction switching mechanism 38 is in the second state in which the supply of the hydraulic oil to the hydraulic cylinder 36a is prohibited, but the discharge of the hydraulic oil from the hydraulic cylinder 36a is permitted when the supplied hydraulic pressure is set to the pressure lower than the first threshold value by the hydraulic pressure switching mechanism 90.

When the flow-direction switching mechanism 38 is in the second state, the discharge of the hydraulic oil from the hydraulic cylinder 36a is permitted. When the hydraulic oil is discharged from the hydraulic cylinder 36a, the eccentric member 32 is rotated in a direction indicated by an arrow in FIG. 12C. On the other hand, when the flow-direction switching mechanism 38 is in the second state, the supply of the hydraulic oil into the hydraulic cylinder 36a is prohibited. When the supply of the hydraulic oil into the hydraulic cylinder 36a is prohibited, the eccentric member 32 cannot be rotated in a direction opposite to the direction indicated by the arrow in FIG. 12C. Therefore, the rotational-direction switching mechanism 33 is in the second state in which the rotation of the eccentric member 32 to the first rotational position is prohibited, and the rotating to the second rotational position is permitted.

The rotational-direction switching mechanism 33 is in the second state as described above. In this case, when a downward inertial force is applied to the piston 5 with the piston 5 reciprocating in the cylinder of the internal combustion engine 1, or a downward force is applied to the piston 5 with an air-fuel mixture being combusted in the combustion chamber 7, the hydraulic piston 36b moves down. On the other hand, when an upward inertial force is applied to the piston 5 with the piston 5 reciprocating in the cylinder of the internal combustion engine 1, the hydraulic piston 36b is to move up. However, since the hydraulic oil is not supplied into the hydraulic cylinder 36a by the action of the check valve 63, a large negative pressure is produced in the hydraulic cylinder 36a when the hydraulic piston 36b is to move up. Thus, the hydraulic piston 36b is not moved up even when the upward inertial force is applied to the piston 5. As a result, in a case shown in FIGS. 11, 12C, the hydraulic piston 36b moves down, and the first arms 32b of the eccentric member 32 connected to the hydraulic piston 36b also move down. Thus, as shown in FIG. 12C, the eccentric member 32 is rotated in the direction of the arrow in FIG. 12C, and the position of the second opening 32d is resultantly lowered. Therefore, the effective length of the connecting rod 6 is decreased to L3 in FIG. 12C. That is, when the hydraulic oil is supplied at the pressure lower than the first threshold value by the hydraulic pressure supply source 75 and the hydraulic pressure switching mechanism 90, the effective length of the connecting rod 6 is decreased. Note that the rotation of the eccentric member 32 in the direction of the arrow in FIG. 12C at this time is stopped with the hydraulic piston 36b abutting against a bottom surface of the hydraulic cylinder 36a. Since the hydraulic pressure at this time is lower than the second threshold value, the stopping member 46 is at the retracted position as shown in FIG. 11.

<Second Embodiment> Next, a variable length connecting rod according to a second embodiment will be described by reference to FIGS. 13 to 19C. A variable length connecting rod 6' according to the second embodiment has a similar configuration to that of the variable length connecting rod 6 according to the first embodiment except for a point described below.

<Configuration of the variable length connecting rod according to the second embodiment> In the present embodiment, a rotational-direction switching mechanism 33' includes two piston mechanisms 36, 37 that are provided on the connecting rod body 31, and a flow-direction switching mechanism 38' that switches a flow of hydraulic oil to the piston mechanisms 36, 37. Therefore, in the present embodiment, the second piston mechanism 37 is provided in addition to the first piston mechanism 36 similar to the piston mechanism of the first embodiment.

The second piston mechanism 37 has a second hydraulic cylinder 37a that is formed in the connecting rod body 31, and a second hydraulic piston 37b that slides in the second hydraulic cylinder 37a. The second hydraulic cylinder is almost or entirely disposed on the second arm 32c-side with respect to the longitudinal axis X of the connecting rod 6'. The second hydraulic cylinder 37a is also disposed at a certain inclined angle with respect to the longitudinal axis X so as to project in the width direction of the connecting rod body 31 toward the small diameter end 31b. The second hydraulic cylinder 37a also communicates with the flow-direction switching mechanism 38' via a second piston communication oil passage 60. The second hydraulic cylinder 37a is also provided closer to the small diameter end 31b than the first hydraulic cylinder 36a.

The second hydraulic piston 37b is connected to the second arms 32c of the eccentric member 32 by a second connection member 44. The second hydraulic piston 37b is rotatably connected to the second connection member 44 by a pin. The second arms 32c are rotatably connected to the second connection member 44 by a pin at an end portion opposite to a side where the second arms 32c are coupled to the sleeve 32a. Therefore, when an operating position of the second hydraulic piston 37b is changed, a rotational position of the eccentric member 32 is changed. In other words, it can be said that the second hydraulic piston 37b is configured such that the operating position is changed along with a change in the rotational position of the eccentric member 32. Note that the second arms 32c of the eccentric member 32 have a symmetrical shape with the first arms 32b in the present embodiment.

An engagement groove 37d that can engage with a stopping member 46' of an intermediate stopping mechanism 34' described later is also formed in a side surface of the second hydraulic piston 37b. Therefore, the engagement groove 37d has almost the same sectional shape as a sectional shape of the stopping member 46'.

Figure 14:
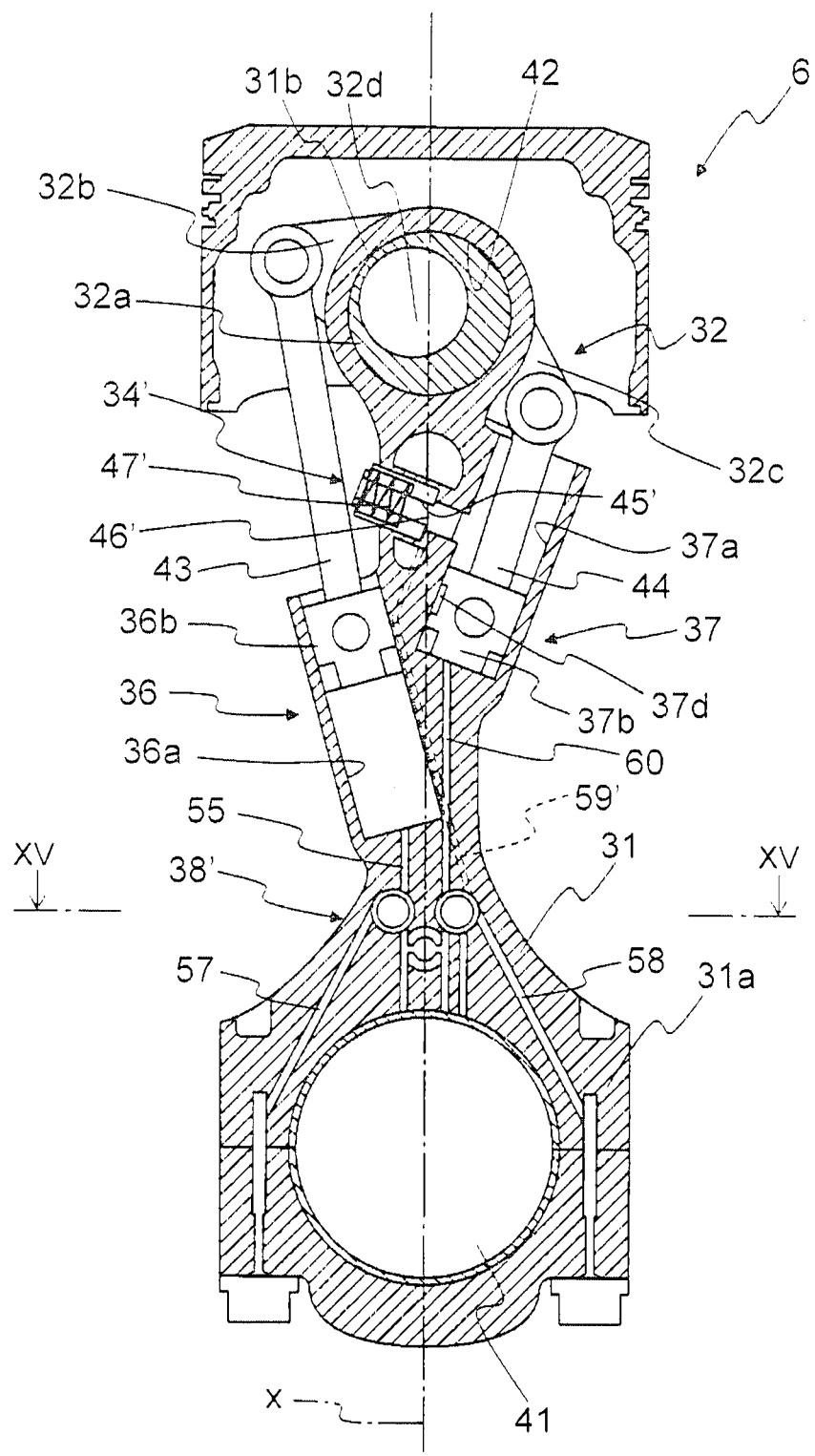
FIG. 14 is a sectional side view similar to FIG. 3 schematically illustrating the variable length connecting rod according to the second embodiment.
Figure 15:
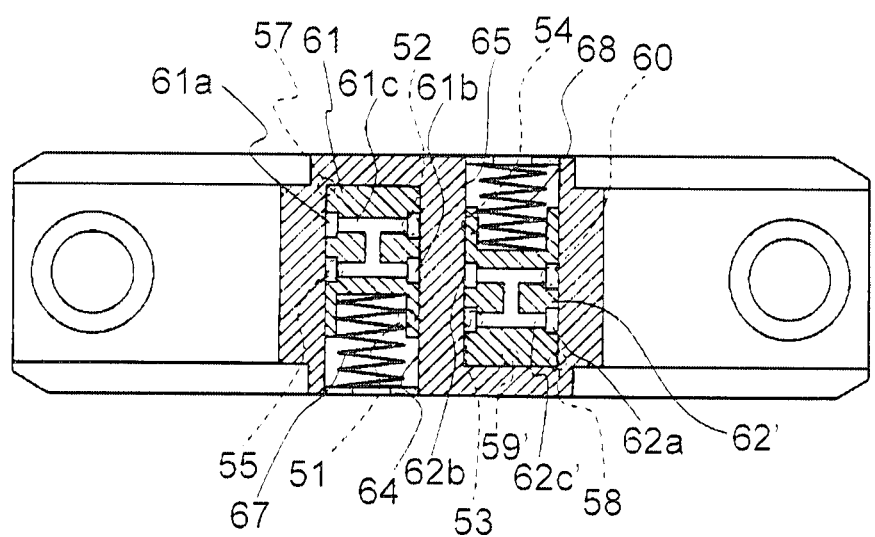
FIG. 15 is a sectional view of the connecting rod taken along XV-XV in FIG. 14.

Next, a configuration of the flow-direction switching mechanism 38' in the present embodiment will be described by reference to FIGS. 14, 15. FIG. 14 is a sectional side view schematically illustrating the variable length connecting rod according to the present embodiment. FIG. 15 is a sectional view similar to FIG. 7 taken along XV-XV in FIG. 14. The flow-direction switching mechanism 38' of the present embodiment can be switched between a first state in which a flow of the hydraulic oil from the first hydraulic cylinder 36a to the second hydraulic cylinder 37a is prohibited, and a flow of the hydraulic oil from the second hydraulic cylinder 37a to the first hydraulic cylinder 36a is permitted, and a second state in which the flow of the hydraulic oil from the first hydraulic cylinder 36a to the second hydraulic cylinder 37a is permitted, and the flow of the hydraulic oil from the second hydraulic cylinder 37a to the first hydraulic cylinder 36a is prohibited.

The flow-direction switching mechanism 38' of the present embodiment includes two switching pins 61, 62', and one check valve 63 similarly to the flow-direction switching mechanism 38 of the first embodiment. The first switching pin 61 and the check valve 63 have similar configurations to those of the first switching pin 61 and the check valve 63 of the first embodiment. However, the second switching pin 62' has a different configuration from that of the second switching pin 62 of the first embodiment.

As shown in FIG. 15, the second switching pin 62' in the present embodiment has the two circumferential grooves 62a, 62b that extend in a circumferential direction of the second switching pin 62'. The circumferential grooves 62a, 62b are brought into communication with each other by a communication passage 62c' that is formed in the second switching pin 62'. The second urging spring 68 is also accommodated in the second pin accommodating space 65. The second switching pin 62' is urged in the direction parallel to the center axis of the first opening 41 by the second urging spring 68. Particularly, in an example shown in FIG. 15, the second switching pin 62' is urged toward the closed end portion of the second pin accommodating space 65.

Therefore, the second switching pin 62' of the present embodiment is formed as a pin having a similar configuration to that of the first switching pin 61. Also, the second switching pin 62' is urged in the direction opposite to the first switching pin 61. Therefore, in the present embodiment, the operating directions of the first switching pin 61 and the second switching pin 62' are opposite to each other when a hydraulic pressure is supplied to the first switching pin 61 and the second switching pin 62'.

The second pin accommodating space 65 that accommodates the second switching pin 62' is brought into communication with the check valve accommodating space 66 via the two space communication oil passages 53, 54 similarly to the first embodiment. The second pin accommodating space 65 is also brought into communication with the second hydraulic cylinder 37a via the second piston communication oil passage 60. As shown in FIG. 15, the second piston communication oil passage 60 is brought into communication with the second pin accommodating space 65 at around the center in the thickness direction of the connecting rod body 31. The second piston communication oil passage 60 is also disposed such that an interval in the thickness direction of the connecting rod body between the third space communication oil passage 53 and the second piston communication oil passage 60, and an interval in the thickness direction of the connecting rod body between the fourth space communication oil passage 54 and the second piston communication oil passage 60 are equal to an interval in the thickness direction of the connecting rod body between the circumferential grooves 62a, 62b.

The second piston communication oil passage 60 is also formed by performing cutting by a drill or the like from the first opening 41. Therefore, the second piston communication oil passage 60 extends to the first opening 41. Thus, it can be said that the second piston communication oil passage 60 is formed such that the first opening 41 is positioned on an extended line of the second piston communication oil passage 60. The second piston communication oil passage 60 is closed by, for example, the bearing metal 71.

Next, the intermediate stopping mechanism 34' of the present embodiment will be described by reference to FIG. 14. In the present embodiment, the intermediate stopping mechanism 34' can also maintain the eccentric member 32 at the intermediate rotational position between the first rotational position and the second rotational position described above by abutting against the eccentric member 32 when the eccentric member 32 is at the intermediate rotational position.

The intermediate stopping mechanism 34' includes a stopping cylinder 45' that is formed in the connecting rod body 31, and the stopping member 46' that can slide in the stopping cylinder 45'. In an example shown in FIG. 14, the stopping cylinder 45' and the stopping member 46' are disposed such that axes of the stopping cylinder 45' and the stopping member 46' extend perpendicular to an axis of the second hydraulic cylinder 37a of the second piston mechanism 37. However, the stopping cylinder 45' and the stopping member 46' may not be disposed perpendicular to the axis of the second hydraulic cylinder 37a as long as the stopping cylinder 45' and the stopping member 46' are angled with respect to the axis of the second hydraulic cylinder 37a.

The stopping member 46' can slide between a projecting position where the stopping member 46' at least partially projects into the second hydraulic cylinder 37a from a surface defining the second hydraulic cylinder 37a, and a retracted position where the stopping member 46' is accommodated in the stopping cylinder 45' and does not project from the surface defining the second hydraulic cylinder 37a. Also, the stopping member 46' is disposed so as to be able to project from the surface defining the second hydraulic cylinder 37a at an axially intermediate portion of the second hydraulic cylinder 37a. When the stopping member 46' is at the projecting position, and the eccentric member 32 is at the intermediate stopping position, the stopping member 46' is engaged with the engagement groove 37d of the second hydraulic piston 37b. Therefore, an operation of the second hydraulic piston 37b is stopped in a state in which the eccentric member 32 is at the intermediate stopping position. On the other hand, when the stopping member 46' is at the retracted position, the stopping member 46' is not engaged with the engagement groove 37d of the second hydraulic piston 37b, so that the second hydraulic piston 37b can be freely operated.

The intermediate stopping mechanism 34' includes an urging spring 47' that urges the stopping member 46' to the retracted position. The stopping cylinder 45' of the intermediate stopping mechanism 34' is brought into communication with the second pin accommodating space 65 via a hydraulic pressure supply oil passage 59'. The hydraulic pressure supply oil passage 59' is brought into communication with the second pin accommodating space 65 at the end portion on the side where the second control oil passage 58 is connected to the second pin accommodating space 65 as shown in FIG. 15. Therefore, the same hydraulic pressure as that of the second control oil passage 58 is supplied to the hydraulic pressure supply oil passage 59'.

In the intermediate stopping mechanism 34' having the above configuration, when a high hydraulic pressure having the second threshold value or higher is not supplied to the stopping cylinder 45' through the hydraulic pressure supply oil passage 59', the stopping member 46' is retracted to the retracted position by an action of the urging spring 47'. On the other hand, when a high hydraulic pressure having the second threshold value or higher is supplied to the stopping cylinder 45' through the hydraulic pressure supply oil passage 59', the stopping member 46' is moved to the projecting position by an action of hydraulic oil supplied into the stopping cylinder 45'.

Note that the stopping member 46' of the intermediate stopping mechanism 34' is configured to engage with the second hydraulic piston 37b that slides in the second hydraulic cylinder 37a provided closer to the small diameter end 31b than the first hydraulic cylinder 36a in the present embodiment. Accordingly, the intermediate stopping mechanism 34' is provided in the connecting rod body 31 on an inner side of the second hydraulic cylinder 37a. Therefore, the intermediate stopping mechanism 34' can be disposed in the connecting rod body 31 almost without projecting from the connecting rod body 31. However, the stopping member 46' of the intermediate stopping mechanism 34' may be also configured to engage with the first hydraulic piston 36b that slides in the first hydraulic cylinder 36a. Therefore, the stopping member 46' of the intermediate stopping mechanism 34' is configured to be engageable with only one of the first hydraulic piston 36b and the second hydraulic piston 37b.

Figure 16:
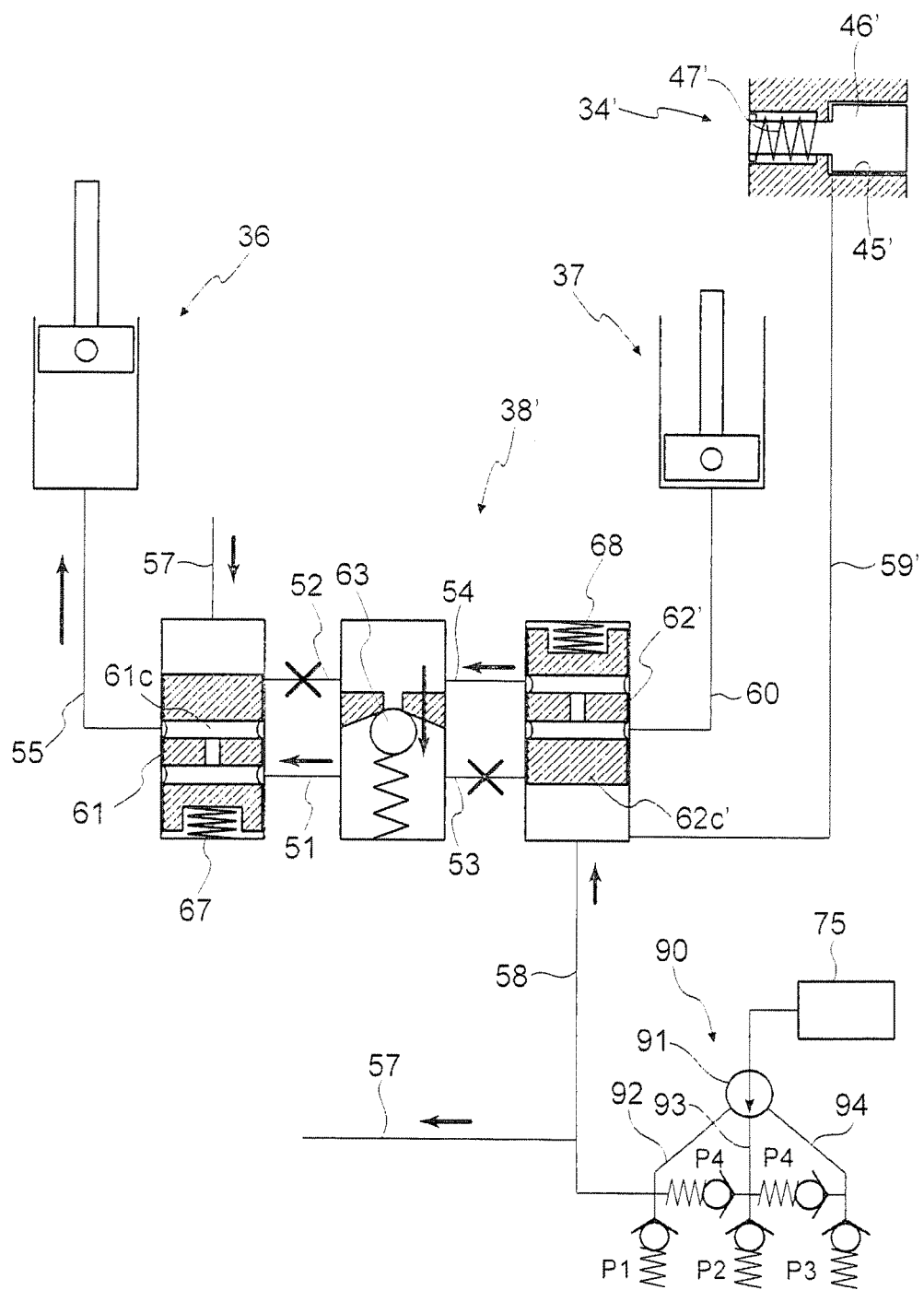
Figure 17:
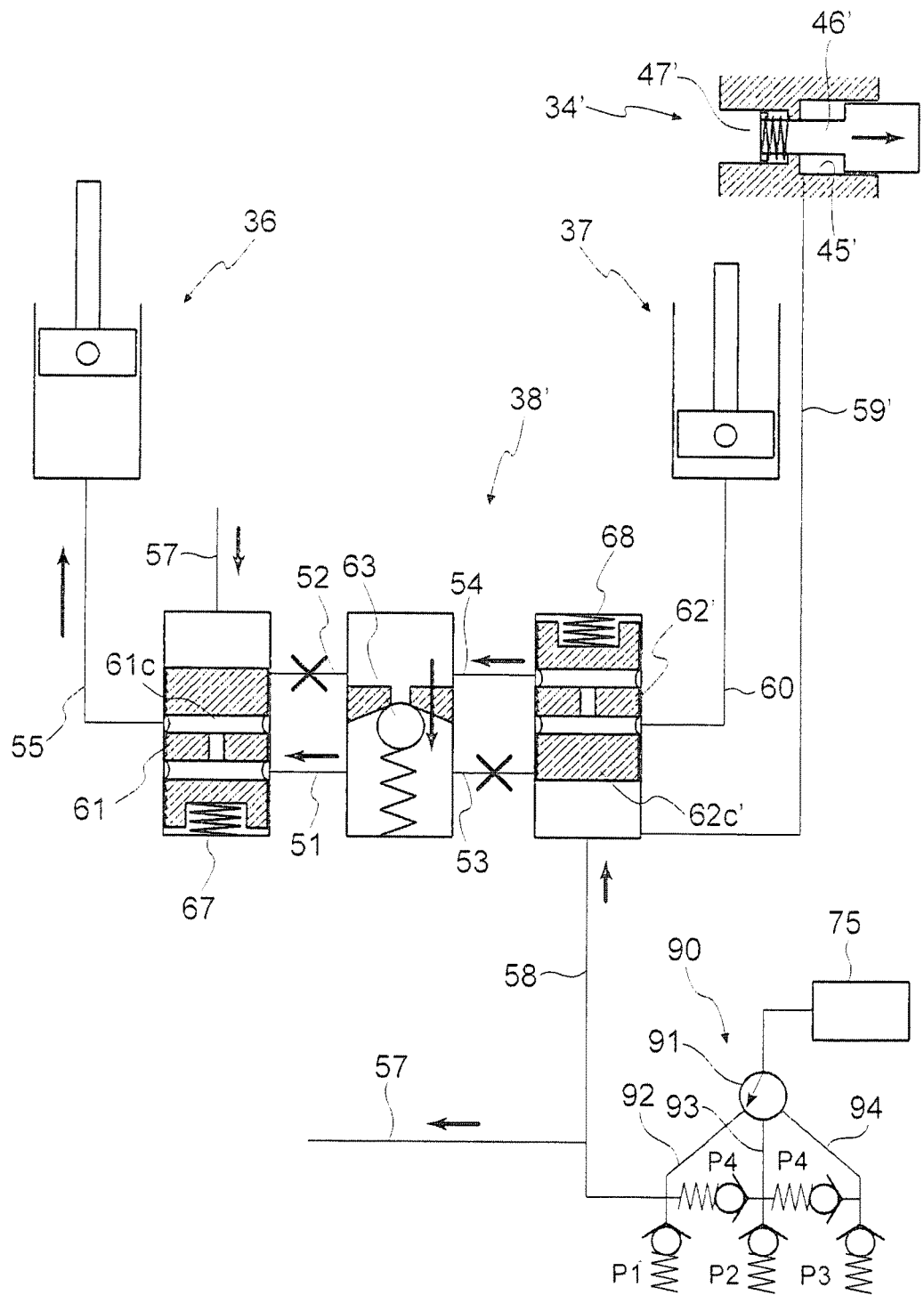
Figure 18:
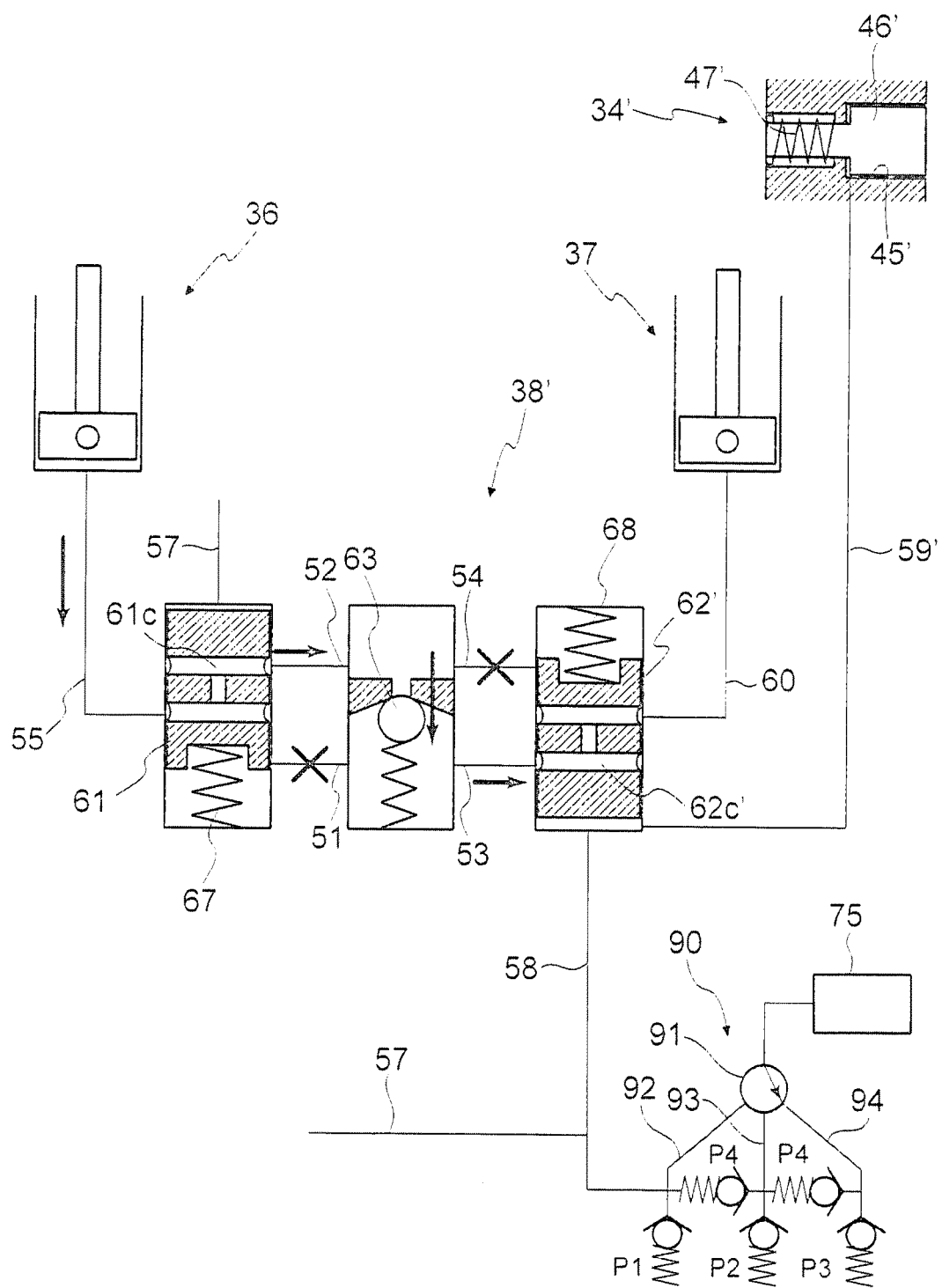

<Operation of the Variable Length Connecting Rod>
Next, an operation of the variable length connecting rod 6' according to the present embodiment will be described by reference to FIGS. 16 to 19C. FIG. 16 is a schematic view similar to FIG. 9 for explaining the operation of the variable length connecting rod 6' when a medium hydraulic pressure is supplied to the switching pins 61, 62' and the stopping member 46'. FIGS. 17, 18 are schematic views similar to FIGS. 10, 11 for explaining the operation of the variable length connecting rod 6' when a high hydraulic pressure is supplied to the switching pins 61, 62' and the stopping member 46', and when a low hydraulic pressure is supplied to the switching pins 61, 62' and the stopping member 46', respectively. FIGS. 19A to 19C are sectional side views schematically illustrating the variable length connecting rod according to the present embodiment. Particularly, FIGS. 19A, 19B, 19C show a state in which the medium hydraulic pressure is supplied to the switching pins or the like, a state in which the high hydraulic pressure is supplied to the switching pins or the like, and a state in which the low hydraulic pressure is supplied to the switching pins or the like, respectively.

In the present embodiment, an operating position of the stopping member 46' is also switched depending on whether the supplied hydraulic pressure has the second threshold value or higher as described above. The second threshold value varies according to a sectional area of the stopping member 46' (or a sectional area of the stopping cylinder 45'), an elastic coefficient of the urging spring 47', or the like. In the present embodiment, the first threshold value is also smaller than the second threshold value. Therefore, when the pressure of the hydraulic oil supplied from the hydraulic pressure supply source 75 is increased, the operating positions of the first switching pin 61 and the second switching pin 62' are switched first, so that the flow-direction switching mechanism 38' is changed from the second state to the first state. After that, when the pressure of the hydraulic oil supplied from the hydraulic pressure supply source 75 is further increased, the operating position of the stopping member 46' is changed from the retracted position to the projecting position.

First, as shown in FIG. 16, when the hydraulic pressure supply source 75 is brought into communication with the oil passage 93 by the three-way valve 91 of the hydraulic pressure switching mechanism 90, the hydraulic pressure supplied to the control oil passages 57, 58 and the hydraulic pressure supply oil passage 59' is set to a medium pressure higher than the first threshold value and lower than the second threshold value. Therefore, the switching pins 61, 62' are moved against the urging of the urging springs 67, 68 to be positioned at first positions, respectively. As a result, the first piston communication oil passage 55 and the first space communication oil passage 51 are brought into communication with each other by the communication passage 61c of the first switching pin 61. The second piston communication oil passage 60 and the fourth space communication oil passage 54 are also brought into communication with each other by the communication passage 62c' of the second switching pin 62'. Therefore, the first hydraulic cylinder 36a is connected to the secondary side of the check valve 63, and the second hydraulic cylinder 37a is connected to the primary side of the check valve 63.

As a result, in a state shown in FIG. 16, the hydraulic oil in the second hydraulic cylinder 37a can be supplied to the first hydraulic cylinder 36a through the oil passages in the order of the second piston communication oil passage 60, the fourth space communication oil passage 54, the first space communication oil passage 51, and the first piston communication oil passage 55. However, the hydraulic oil in the first hydraulic cylinder 36a cannot be supplied to the second hydraulic cylinder 37a. Therefore, it can be said that the flow-direction switching mechanism 38' is in the first state in which the flow of the hydraulic oil from the first hydraulic cylinder 36a to the second hydraulic cylinder 37a is prohibited, and the flow of the hydraulic oil from the second hydraulic cylinder 37a to the first hydraulic cylinder 36a is permitted when the supplied hydraulic pressure is set to the pressure higher than the first threshold value and lower than the second threshold value by the hydraulic pressure switching mechanism 90.

When the flow-direction switching mechanism 38' is in the first state, the flow of the hydraulic oil from the second hydraulic cylinder 37a to the first hydraulic cylinder 36a is permitted. When the hydraulic oil is supplied into the first hydraulic cylinder 36a, the eccentric member 32 is rotated in a direction indicated by an arrow in FIG. 19A. On the other hand, when the flow-direction switching mechanism 38' is in the first state, the flow of the hydraulic oil from the first hydraulic cylinder 36a to the second hydraulic cylinder 37a is prohibited. When the flow of the hydraulic oil from the first hydraulic cylinder 36a is prohibited, the eccentric member 32 cannot be rotated in a direction opposite to the direction indicated by the arrow in FIG. 19A. Therefore, the rotational-direction switching mechanism 33' is in the first state in which the rotation of the eccentric member 32 to the first rotational position is permitted, and the rotating to the second rotational position is prohibited.

The rotational-direction switching mechanism 33' is in the first state as described above. In this case, when an upward inertial force is applied to the piston 5 with the piston 5 reciprocating in the cylinder of the internal combustion engine 1, the first hydraulic piston 36b moves up. On the other hand, even when a downward inertial force is applied to the piston 5 with the piston 5 reciprocating in the cylinder of the internal combustion engine 1, or a downward force is applied to the piston 5 with an air-fuel mixture being combusted in the combustion chamber 7, the first hydraulic piston 36b is not moved down. As a result, the effective length of the connecting rod 6' is kept long. Therefore, when the hydraulic oil is supplied at the pressure higher than the first threshold value and lower than the second threshold value by the hydraulic pressure supply source 75 and the hydraulic pressure switching mechanism 90, the effective length of the connecting rod 6' is increased to L1 in FIG. 19A. Note that the rotation of the eccentric member 32 in the direction of the arrow in FIG. 19A at this time is stopped with the second hydraulic piston 37b abutting against a bottom surface of the second hydraulic cylinder 37a. On the other hand, since the hydraulic pressure at this time is lower than the second threshold value, the stopping member 46' is at the retracted position as shown in FIG. 16.

As shown in FIG. 17, when the hydraulic pressure supply source 75 is brought into communication with the oil passage 92 by the three-way valve 91 of the hydraulic pressure switching mechanism 90, the hydraulic pressure supplied to the control oil passages 57, 58 and the hydraulic pressure supply oil passage 59' is set to a pressure higher than the second threshold value. Thus, the hydraulic pressure at this time is higher than the first threshold value. Therefore, the switching pins 61, 62' are moved against the urging of the urging springs 67, 68 to be positioned at the first positions, respectively, similarly to the state shown in FIG. 16. Consequently, the flow-direction switching mechanism 38' is in the first state, and the first hydraulic piston 36b moves up.

On the other hand, since the hydraulic pressure at this time is higher than the second threshold value, the stopping member 46' is moved to the projecting position as shown in FIG. 17. Therefore, the second hydraulic piston 37b engages with the stopping member 46' before the eccentric member 32 reaches the first rotational position (the rotational position reached when the eccentric member 32 is maximally rotated in the direction indicated by the arrow in FIG. 19A). Accordingly, the eccentric member 32 can not rotate anymore, and is stopped and maintained at the intermediate rotational position between the first rotational position and the second rotational position. Therefore, when the high hydraulic pressure is supplied from the hydraulic pressure supply source 75, the effective length of the connecting rod 6' becomes a medium length as indicated by L2 in FIG. 19B.

On the other hand, as shown in FIG. 18, when the hydraulic pressure supply source 75 is brought into communication with the oil passage 94 by the three-way valve 91 of the hydraulic pressure switching mechanism 90, the hydraulic pressure supplied to the control oil passages 57, 58 and the hydraulic pressure supply oil passage 59' is set to a pressure lower than the first threshold value. Therefore, the switching pins 61, 62' are urged by the urging springs 67, 68 to be positioned at second positions, respectively, as shown in FIG. 18. As a result, the first piston communication oil passage 55 and the second space communication oil passage 52 are brought into communication with each other by the communication passage 61c of the first switching pin 61. The second piston communication oil passage 60 and the third space communication oil passage 53 are also brought into communication with each other by the communication passage 62c' of the second switching pin 62'. Therefore, the second hydraulic cylinder 37a is connected to the primary side of the check valve 63, and the first hydraulic cylinder 36a is connected to the secondary side of the check valve 63.

As a result, in an example shown in FIG. 18, the hydraulic oil in the first hydraulic cylinder 36a can be supplied to the second hydraulic cylinder 37a through the oil passages in the order of the first piston communication oil passage 55, the second space communication oil passage 52, the third space communication oil passage 53, and the second piston communication oil passage 60. However, the hydraulic oil in the second hydraulic cylinder 37a cannot be supplied to the first hydraulic cylinder 36a. Therefore, it can be said that the flow-direction switching mechanism 38' is in the second state in which the flow of the hydraulic oil from the first hydraulic cylinder 36a to the second hydraulic cylinder 37a is permitted, and the flow of the hydraulic oil from the second hydraulic cylinder 37a to the first hydraulic cylinder 36a is prohibited when the supplied hydraulic pressure is set to the pressure lower than the first threshold value by the hydraulic pressure switching mechanism 90.

When the flow-direction switching mechanism 38' is in the second state, the flow of the hydraulic oil from the first hydraulic cylinder 36a to the second hydraulic cylinder 37a is permitted. When the hydraulic oil is supplied into the second hydraulic cylinder 37a, the eccentric member 32 is rotated in a direction indicated by an arrow in FIG. 19C. On the other hand, when the flow-direction switching mechanism 38' is in the second state, the flow of the hydraulic oil from the second hydraulic cylinder 37a to the first hydraulic cylinder 36a is prohibited. When the flow of the hydraulic oil from the second hydraulic cylinder 37a is prohibited, the eccentric member 32 cannot be rotated in a direction opposite to the direction indicated by the arrow in FIG. 19C. Therefore, the rotational-direction switching mechanism 33' is in the second state in which the rotation of the eccentric member 32 to the first rotational position is prohibited, and the rotating to the second rotational position is permitted.

The rotational-direction switching mechanism 33' is in the second state as described above. In this case, when a downward inertial force is applied to the piston 5 with the piston 5 reciprocating in the cylinder of the internal combustion engine 1, or a downward force is applied to the piston 5 with an air-fuel mixture being combusted in the combustion chamber 7, the second hydraulic piston 37b moves up. On the other hand, even when an upward inertial force is applied to the piston 5 with the piston 5 reciprocating in the cylinder of the internal combustion engine 1, the second hydraulic piston 37b is not moved down. As a result, the effective length of the connecting rod 6' is kept short. Therefore, when the hydraulic oil is supplied at the pressure lower than the first threshold value by the hydraulic pressure supply source 75 and the hydraulic pressure switching mechanism 90, the effective length of the connecting rod 6' is decreased to L3 in FIG. 19C. Since the hydraulic pressure at this time is lower than the second threshold value, the stopping member 46' is at the retracted position as shown in FIG. 18.

Note that the stopping member 46' of the intermediate stopping mechanism 34' is configured to engage with the second hydraulic piston 37b of the second piston mechanism 37 in the second embodiment described above. However, the stopping member 46' of the intermediate stopping mechanism 34' may be configured to engage with the first hydraulic piston 36b of the first piston mechanism 36.

Also, in the second embodiment described above, the connecting rod 6' is provided with the two piston mechanisms. However, the connecting rod may be provided with only one piston mechanism similarly to the first embodiment, and the hydraulic piston of the piston mechanism and the stopping member of the intermediate stopping mechanism may be configured to engage with each other.

The invention claimed is:

1. A variable length connecting rod comprising:
a connecting rod body including a large diameter end and a small diameter end, the small diameter end being an end portion positioned on an opposite side to the large diameter end in an axial direction of the connecting rod body, and the connecting rod body having a first opening that receives a crankpin at the large diameter end;
an eccentric member provided at the small diameter end such that the eccentric member rotates in a circumferential direction of the small diameter end with respect to the connecting rod body, the eccentric member having a second opening that receives a piston pin, and the eccentric member being configured to rotate such that a position of the second opening relative to the connecting rod body is changed and an effective length of the variable length connecting rod is varied;
a rotational-direction switching mechanism including a hydraulic piston,
the hydraulic piston being connected to the eccentric member such that an operating position of the hydraulic piston is changed along with a change in a rotational position of the eccentric member,
the rotational-direction switching mechanism being configured to be switched between a first state and a second state,
the first state being a state in which the eccentric member rotates to a first side, and rotation of the eccentric member to a second side that is a direction opposite to the first side is prohibited,
the second state being a state in which the eccentric member rotates to the second side, and rotation of the eccentric member to the first side is prohibited,
the eccentric member maximally rotating to the first side to reach a first rotational position, and being maintained at the first rotational position when the rotational-direction switching mechanism is in the first state, and
the eccentric member maximally rotating to the second side to reach a second rotational position, and being maintained at the second rotational position when the rotational-direction switching mechanism is in the second state; and
an intermediate stopping mechanism including a stopping member, the stopping member being configured to abut against or engage with the eccentric member or the hydraulic piston such that the eccentric member is maintained at an intermediate rotational position between the first rotational position and the second rotational position when the eccentric member is at the intermediate rotational position.

2. The variable length connecting rod according to claim 1, wherein
the intermediate stopping mechanism is provided in the connecting rod body,
the stopping member is configured to project from the connecting rod body,
the stopping member is configured to project from the connecting rod body when a hydraulic pressure equal to or higher than a given pressure is supplied to the intermediate stopping mechanism, and
the stopping member is configured to abut against the eccentric member when the stopping member projects from the connecting rod body, and the eccentric member is at the intermediate rotational position.

3. The variable length connecting rod according to claim 2, wherein
the connecting rod body includes a rod portion, the rod portion being positioned between the large diameter end and the small diameter end, and
the intermediate stopping mechanism is disposed on a small diameter end side of the connecting rod body.

4. The variable length connecting rod according to claim 2, wherein
the eccentric member includes a sleeve, a first arm, and a second arm,
the first arm is coupled to the sleeve, and the first arm is connected to the hydraulic piston of the rotational-direction switching mechanism,
the second arm is coupled to the sleeve, and the second arm is disposed opposite to the first arm with respect to the sleeve,
the connecting rod body has a third opening that receives the sleeve,
the sleeve is configured to rotate in the circumferential direction of the small diameter end in the third opening, and
the second arm is configured to abut against the stopping member when the stopping member projects from the connecting rod body.

5. The variable length connecting rod according to claim 4, wherein
the second arm is curved so as to extend toward the large diameter end with respect to a radial direction of the eccentric member at an end portion opposite to a sleeve side.

6. The variable length connecting rod according to claim 4, wherein
the eccentric member is provided such that the piston pin receiving opening is eccentric from a rotational axis of the eccentric member toward the first arm.

7. The variable length connecting rod according to claim 2, wherein
the stopping member is configured to slide in an axial direction of the stopping member according to the hydraulic pressure supplied to the intermediate stopping mechanism,
the stopping member is configured to slide so as to project from the connecting rod body, and
a sliding direction of the stopping member is perpendicular to an axis of the first opening and a longitudinal axis of the connecting rod body.

8. The variable length connecting rod according to claim 1, wherein the connecting rod body includes a hydraulic cylinder, the hydraulic cylinder accommodates the hydraulic piston of the rotational-direction switching mechanism, the hydraulic piston of the rotational-direction switching mechanism has an engagement groove in a side surface of the rotational-direction switching mechanism, the intermediate stopping mechanism is disposed within the connecting rod body, the stopping member is configured to project into the hydraulic cylinder when a hydraulic pressure equal to or higher than a given pressure is supplied to the intermediate stopping mechanism, and the stopping member is configured to engage with the engagement groove of the hydraulic piston when the stopping member projects into the hydraulic cylinder.

9. The variable length connecting rod according to claim 8, wherein the eccentric member includes a sleeve, a first arm, and a second arm, the first arm is coupled to the sleeve, the second arm is coupled to the sleeve, and the second arm is disposed opposite to the first arm with respect to the sleeve, the connecting rod body has a third opening that receives the sleeve, the connecting rod body includes a first hydraulic cylinder and a second hydraulic cylinder, the sleeve is configured to rotate in the third opening, the rotational-direction switching mechanism includes a first hydraulic piston and a second hydraulic piston, the first hydraulic piston is configured to slide in the first hydraulic cylinder, the first hydraulic piston is connected to the first arm, the second hydraulic piston is configured to slide in the second hydraulic cylinder, the second hydraulic piston is connected to the second arm, and the stopping member is configured to engage with only one of the first hydraulic piston and the second hydraulic piston.

10. The variable length connecting rod according to claim 9, wherein the second hydraulic cylinder is disposed closer to the small diameter end than the first hydraulic cylinder, and the stopping member is configured to engage with the second hydraulic piston.

11. The variable length connecting rod according to claim 2, wherein the eccentric member is configured such that the effective length of the variable length connecting rod is maximum when the eccentric member is at the first rotational position, and the intermediate stopping mechanism is configured such that the hydraulic pressure equal to or higher than the given pressure is supplied to the intermediate stopping mechanism only when the rotational-direction switching mechanism is in the first state.

12. The variable length connecting rod according to claim 1, wherein the connecting rod body includes a hydraulic cylinder, the rotational-direction switching mechanism and the intermediate stopping mechanism are connected to a same hydraulic pressure supply source, the rotational-direction switching mechanism is configured to be in the first state when a hydraulic pressure supplied from the hydraulic pressure supply source has a first threshold value or higher, the rotational-direction switching mechanism is in the second state when the hydraulic pressure supplied from the hydraulic pressure supply source is lower than the first threshold value, the intermediate stopping mechanism is configured such that the stopping member projects from the connecting rod body or into the hydraulic cylinder that accommodates the hydraulic piston when the hydraulic pressure supplied from the hydraulic pressure supply source has a second threshold value or higher, and the first threshold value is lower than the second threshold value.

13. The variable length connecting rod according to claim 12, wherein the hydraulic pressure supplied to the rotational-direction switching mechanism, and the intermediate stopping mechanism is switched by a hydraulic pressure switching mechanism, the hydraulic pressure switching mechanism includes a switching valve that switches a flow of hydraulic oil, and the switching valve is configured to change the hydraulic pressure supplied to the rotational-direction switching mechanism and the intermediate stopping mechanism.

14. A variable compression ratio internal combustion engine comprising a variable length connecting rod including a connecting rod body, an eccentric member, a rotational-direction switching mechanism and an intermediate stopping mechanism, the connecting rod body including a large diameter end and a small diameter end, the small diameter end being an end portion positioned on an opposite side to the large diameter end in an axial direction of the connecting rod body, and the connecting rod body having a first opening that receives a crankpin at the large diameter end;

the eccentric member provided at the small diameter end such that the eccentric member rotates in a circumferential direction of the small diameter end with respect to the connecting rod body, the eccentric member having a second opening that receives a piston pin, and the eccentric member being configured to rotate such that a position of the second opening relative to the connecting rod body is changed and an effective length of the variable length connecting rod is varied;

the rotational-direction switching mechanism including a hydraulic piston, the hydraulic piston being connected to the eccentric member such that an operating position of the hydraulic piston is changed along with a change in a rotational position of the eccentric member, the rotational-direction switching mechanism being configured to be switched between a first state and a second state, the first state being a state in which the eccentric member rotates to a first side, and rotation of the eccentric member to a second side that is a direction opposite to the first side is prohibited, the second state being a state in which the eccentric member rotates to the second side, and rotation of the eccentric member to the first side is prohibited, the eccentric member maximally rotating to the first side to reach a first rotational position, and being maintained at the first rotational position when the rotational-direction switching mechanism is in the first state, and the eccentric member maximally rotating to the second side to reach a second rotational position, and being maintained at the second rotational position when the rotational-direction switching mechanism is in the second state; and the intermediate stopping mechanism including a stopping member, the stopping member being configured to abut against or engage with the eccentric member or the hydraulic piston such that the eccentric member is maintained at an intermediate rotational position between the first rotational position and the second rotational position when the eccentric member is at the intermediate rotational position, wherein the effective length of the variable length connecting rod is varied such that a mechanical compression ratio is varied.

15. The variable length connecting rod according to claim 8, wherein the rotational-direction switching mechanism and the intermediate stopping mechanism are connected to a same hydraulic pressure supply source, the rotational-direction switching mechanism is configured to be in the first state when a hydraulic pressure supplied from the hydraulic pressure supply source has a first threshold value or higher, the rotational-direction switching mechanism is in the second state when the hydraulic pressure supplied from the hydraulic pressure supply source is lower than the first threshold value, the intermediate stopping mechanism is configured such that the stopping member projects from the connecting rod body or into the hydraulic cylinder that accommodates the hydraulic piston when the hydraulic pressure supplied from the hydraulic pressure supply source has a second threshold value or higher, and the first threshold value is lower than the second threshold value.

* * * * *